US009460051B2

(12) United States Patent
Horne

(10) Patent No.: US 9,460,051 B2
(45) Date of Patent: Oct. 4, 2016

(54) METHOD FOR UTILIZATION CALCULATION ON EQUIPMENT INCLUDING INDEPENDENT COMPONENT

(71) Applicant: ZTR Control Systems, Inc., Shakopee, MN (US)

(72) Inventor: Brent Robert Horne, London (CA)

(73) Assignee: ZTR Control Systems, Inc.

( * ) Notice: Subject to any disclaimer, the term of this patent is extended or adjusted under 35 U.S.C. 154(b) by 347 days.

(21) Appl. No.: 13/654,128

(22) Filed: Oct. 17, 2012

(65) Prior Publication Data

US 2013/0096799 A1 Apr. 18, 2013

Related U.S. Application Data

(60) Provisional application No. 61/548,097, filed on Oct. 17, 2011.

(51) Int. Cl.
*G06F 19/00* (2011.01)
*G06F 17/00* (2006.01)
(Continued)

(52) U.S. Cl.
CPC ............ *G06F 17/00* (2013.01); *E02F 9/2054* (2013.01); *E02F 9/26* (2013.01); *G06Q 10/00* (2013.01); *G07C 5/008* (2013.01)

(58) Field of Classification Search
CPC  B62D 55/30; C07K 14/245; C07K 2319/00; C07K 2319/21; C07K 2319/50; C07K 2319/90; G06F 17/00
USPC ............... 701/99, 33; 340/679, 989, 539.1; 187/282, 237, 291; 705/11
See application file for complete search history.

(56) References Cited

U.S. PATENT DOCUMENTS 3,965,669 A * 6/1976 Larson ..................... G07C 3/00
368/5
5,003,518 A 3/1991 Felder
(Continued)

FOREIGN PATENT DOCUMENTS

EP 1273723 A1 1/2003
EP 1686217 A1 8/2006
(Continued)

OTHER PUBLICATIONS

Lavin Liermo, J.; Search report from corresponding European Application No. 12188910.9; search completed Jan. 7, 2014.

*Primary Examiner* — Helal A. Algahaim
*Assistant Examiner* — Shardul Patel
(74) *Attorney, Agent, or Firm* — Brett J. Slaney; Blake, Cassels & Graydon LLP

(57) ABSTRACT

Embodiments relate to a method of monitoring an asset including an independent component, the method including: receiving at an electronic device data related to operation of an asset, the data including utilization data of an independent component of the asset; interpreting, using a processor, the utilization to determine an utilization or operational characteristic of the asset; performing, using a processor, analysis of the utilization or operational characteristic in view of a stored target to produce a performance output; filtering, using a processor, to improve accuracy; and providing a report that includes the operational characteristic and/or utilization output; wherein utilization data of the independent component is generated by detecting the engine status of a prime mover of the asset; detecting a position of the independent component; wherein the independent component provides work functionality independent of the engine status.

19 Claims, 19 Drawing Sheets

(51) Int. Cl.
  *G06Q 10/00* (2012.01)
  *E02F 9/26* (2006.01)
  *E02F 9/20* (2006.01)
  *G07C 5/00* (2006.01)

(56) References Cited

U.S. PATENT DOCUMENTS

| | | | |
|---|---|---|---|
| 6,202,013 B1 | 3/2001 | Anderson et al. | |
| 6,330,933 B1* | 12/2001 | Boeckman | B66F 11/042 182/18 |
| 6,822,930 B2* | 11/2004 | Falgout, Sr. | G07C 5/04 368/1 |
| 7,048,185 B2 | 5/2006 | Hart | |
| 7,154,814 B2 | 12/2006 | Straka | |
| 7,287,625 B1* | 10/2007 | Harris | B66F 9/0755 187/237 |
| 7,502,744 B2 | 3/2009 | Garrow et al. | |
| 7,649,810 B2 | 1/2010 | Anfinson | |
| 2002/0016655 A1 | 2/2002 | Joao | |
| 2002/0065698 A1 | 5/2002 | Schick et al. | |
| 2003/0036939 A1 | 2/2003 | Flores et al. | |
| 2003/0185103 A1 | 10/2003 | Rothman | |
| 2006/0202817 A1* | 9/2006 | Mackenzie | G06Q 10/08 340/539.13 |
| 2006/0273918 A1 | 12/2006 | Ram et al. | |
| 2007/0263478 A1* | 11/2007 | Burch | B28C 5/4213 366/61 |
| 2008/0084333 A1* | 4/2008 | Forrest | G06Q 10/06 340/989 |
| 2009/0015422 A1* | 1/2009 | Sixt, Jr. | G07C 3/00 340/679 |
| 2009/0040061 A1 | 2/2009 | Golunski et al. | |
| 2009/0140872 A1* | 6/2009 | O'Neal | G05B 9/03 340/679 |
| 2009/0146828 A1* | 6/2009 | Eschelbacher | A63J 1/028 340/679 |
| 2009/0183927 A1* | 7/2009 | Huber | B66F 17/003 177/141 |
| 2009/0192659 A1* | 7/2009 | Beebe | G06F 11/0739 701/2 |
| 2010/0093487 A1* | 4/2010 | Jerwick | B60K 6/48 477/3 |
| 2010/0094687 A1* | 4/2010 | Waggaman, III | G06Q 10/06398 705/7.42 |
| 2010/0117594 A1* | 5/2010 | Bissontz | B60K 6/48 320/104 |
| 2010/0326747 A1* | 12/2010 | Ratliff | F04D 13/06 180/53.8 |
| 2011/0051558 A1 | 3/2011 | Janssen et al. | |
| 2011/0227744 A1* | 9/2011 | Shibata | G05B 23/0272 340/679 |
| 2011/0307141 A1* | 12/2011 | Westerlage | G06Q 30/0283 701/29.1 |

FOREIGN PATENT DOCUMENTS

| | | |
|---|---|---|
| EP | 1767708 A2 | 3/2007 |
| GB | 2360500 A | 9/2001 |
| WO | 0217184 A1 | 2/2002 |

\* cited by examiner

Machines on Site

| Make | Model | Machine ID | Serial Number | Load Capacity (Cu Yd) | Machine Cost ($/hr) | Engine Hours |
|---|---|---|---|---|---|---|
| AGCO | MT865B | 550704 | BDS61353 | 22 | $140 | 2,396 |
| AGCO | MT865B | 550705 | AGCC0865PNSKF1019 | 22 | $140 | 1,626 |

Production

| Model | Machine ID ① | Avg Start Time ② | Avg Stop Time ③ | Avg RT Distance (mi) ④ | Avg Loads ⑤ | Avg Travel To Unload (min) ⑥ | Avg Travel To Load (min) ⑦ | Avg Cycle Time (min) ⑧ | Efficiency (%) ⑨ |
|---|---|---|---|---|---|---|---|---|---|
| Target | | 7:00AM | 5:30PM | 0.40 | 90 | 1.5 | 3.3 | 4.8 | 100 % |
| MT865B | 550704 | 7:30AM | 2:24PM | 1.18 | 82 | | | | |
| MT865B | 550705 | 7:00AM | 5:27PM | 1.24 | | | | | |
| Site Avg | | 7:56AM | 3:40PM | 1.21 | 76 | | | | |

Profitability

| Model | Machine ID | Loads | Material Moved (Cu Yd) ⑩ | Machine Cost ($) ⑪ | Revenue ($) ⑫ | Profit ($) ⑬ | Efficiency (%) ⑭ |
|---|---|---|---|---|---|---|---|
| Target | | 90 | 1,980 | $1,540 | $2,930 | $1,390 | 100 % |
| MT865B | 550704 | | | $1,120 | | | |
| MT865B | 550705 | 75 | 1,672 | $1,260 | $2,475 | | |
| Site Avg | | | | $1,190 | | | |
| Target Total | 2 units | 180 | 3,960 | $3,080 | $5,861 | $2,781 | 100 % |
| Site Total | | 152 | 3,344 | $2,380 | $4,949 | | |

FIGURE 11

Machine Utilization

| Model | Machine ID | Start Time | Stop Time | Available Time (hrs) | Shutdown Time (min) | Total Idle Time (min) | Total Idle Events | Average IC Time (min) | 80-90% Working Time (hrs) | 90% Efficiency (%) |
|---|---|---|---|---|---|---|---|---|---|---|
| Target | | 06:00 AM | 06:30 PM | 12.50 | 40.0 | 35.0 | 7 | 5.0 | 11.25 | 100% |
| 740 | 74007 | 06:05 AM | 06:00 PM | 11.92 | 14 | 46.8 | 9 | 5.8 | 9.90 | 88% |
| 740 | 74008 | 06:10 AM | 06:05 PM | 11.84 | 60.0 | 54.6 | 10 | 5.4 | 9.56 | 85% |
| 740 | 74005 | 06:00 AM | 06:10 PM | 12.17 | 60.6 | 42.9 | 8 | 4.2 | 10.46 | 85% |

Fuel Utilization

| Model | ID | Total Fuel (gal) | Total Idle Fuel (gal) | Avg Fuel Rate (gal/hr) | 80-90% Avg Horsepower | 90% Efficiency % |
|---|---|---|---|---|---|---|
| Target | | 101.3 | 2.4 | 9.0 | 250 | 100% |
| 740 | | 82.5 | | 7.72 | 213 | 85% |
| 740 | 74008 | 69.3 | | 6.6 | 241 | 96% |
| 740 | 74005 | 90.3 | 2.9 | 8.08 | 222 | 89% |

FIGURE 12

Machine Maintenance

| Model | Machine ID | Engine Hours | Next Level 1 | Hours to Level 1 | Next Level 2 | Hours to Level 2 | Next Level 3 | Hours to Level 3 | Next Level 4 | Hours to Level 4 |
|---|---|---|---|---|---|---|---|---|---|---|
| 315BL | | 8836 | 9250 | 414 | 9500 | 664 | 9000 | 164 | 10,000 | 1164 |
| 740 | | 6376 | 6750 | 374 | 6500 | 124 | 7000 | 624 | 8000 | 1624 |
| 740 | 74008 | 6283 | 6750 | 467 | 6500 | 217 | 7000 | 717 | 8000 | 1717 |
| 740 | 74005 | 4965 | 5250 | 285 | 5500 | 535 | 5000 | 35 | 6000 | 1035 |

Level 1 = 250 Hrs, Level 2 = 500 Hrs, Level 3 = 1000 Hrs, Level 4 = 2000 Hrs

FIGURE 13

METHOD FOR UTILIZATION CALCULATION ON EQUIPMENT INCLUDING INDEPENDENT COMPONENT

CROSS-REFERENCE TO RELATED APPLICATIONS

This application is related to U.S. Provisional Application No. 61/219,054 filed on Jun. 22, 2009, entitled "Asset Information Reporting," and U.S. application Ser. No. 12/795,455, filed on Jun. 7, 2010, which are all incorporated herein by reference in their entirety. This application claims priority to U.S. Provisional Application No. 61/548,097, filed Oct. 17, 2011, the disclosure of which is herein incorporated by reference.

FIELD

This application relates generally to asset information reporting and, more specifically, to processing, analysis, and presentation of data associated with construction or agricultural asset operations.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A monitoring system can be installed on an asset (e.g., an excavator) to enable the owner of the asset or a third party to monitor the asset's location and performance. The monitoring system can utilize the Global Positioning System (GPS) or a cellular triangulation system to determine the location of the asset and include a communication component, such as a cellular or a satellite transceiver, to transmit the asset's location and performance. When no communication network is available, the monitoring device can store data in its internal memory and communicate the stored data when the network becomes available again.

However, a typical monitoring system provides unreliable performance data due to inaccuracies occurring while detecting some performance events. Furthermore, the performance data can be missing some important information and a user can be required to get the data from a third party server and, thereafter calculate and interpret the data themselves over time. Often, no data analysis or interpretations is performed and the data is presented in a confusing format.

BRIEF DESCRIPTION OF DRAWINGS

Example embodiments are illustrated by way of example and not limitation in the figures of the accompanying drawings, in which like references indicate similar elements and in which:

FIG. 11 is a block diagram showing a production report, in accordance with an example embodiment;

FIG. 12 is a block diagram showing a utilization report, in accordance with an example embodiment;

FIG. 13 is a block diagram showing a maintenance report, in accordance with an example embodiment.

DETAILED DESCRIPTION

Figure 1A:
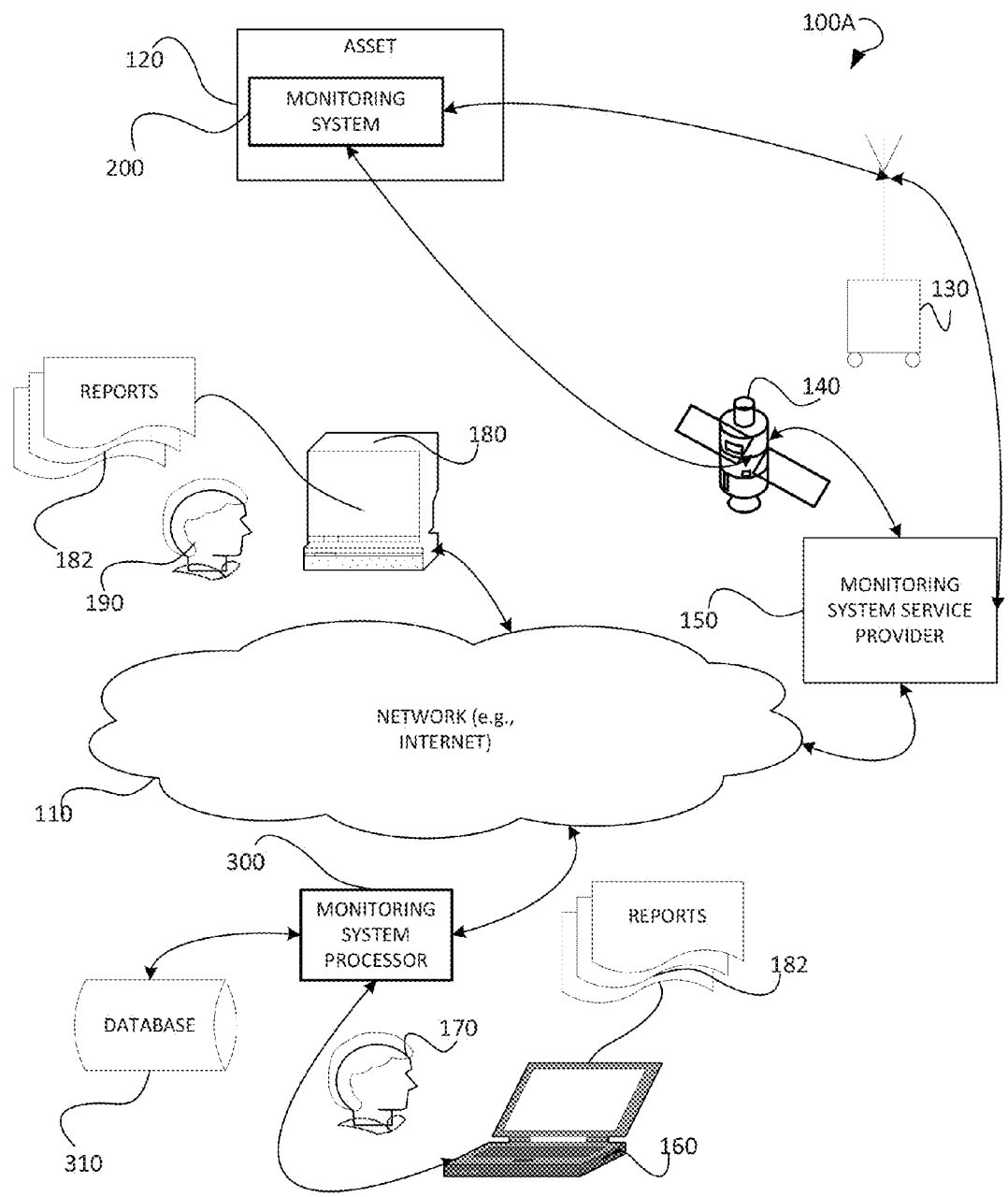
FIG. 1A is a block diagram showing architecture within which asset information reporting is implemented, in accordance with an example embodiment.

In an example embodiment, a method to collect, to process, to analyze, and to present data related to the asset is provided. A monitoring system is installed on an asset, for example, construction equipment, agricultural equipment, on-highway equipment, rail equipment, or off-highway equipment to enable monitoring the location and performance of the asset. The monitoring system can include, among other components, one or more monitoring device and sensors. The monitoring system collects and transfers information to a monitoring system provider which, in turn, can make the information available to the owner of the asset or a third party. The monitoring system can include processors to process data from the sensors and monitors at the asset. A monitoring system processor can pull the information from the monitoring system provider for processing, analysis, filtering, and generation of reports based on the information related to the asset. Any of the monitoring system, the monitoring system provider, the monitoring system processor or combinations thereof can receive additional data from additional sources to combine with the monitoring system data. Examples of additional sources include mobile telephones, mobile computing device, navigational systems, and positioning systems.

The above method(s), systems(s) and device(s) can report on the utilization of an asset, e.g., lift equipment, material handling equipment, construction equipment, etc. The asset can include a sensor that senses its utilization in ways other than the prime mover, e.g., electrical motor or combustion engine, run time. In an example, run-time can be used as a factor in determining run-time.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In some example embodiments, the information related to an asset can be collected in production, utilization, maintenance, and health areas. For a specific asset (e.g., a construction machine), the information collected in the production area can include an ignition status, a distance moved since last valid loading or unloading event, a time elapsed since the last valid loading or unloading event, a loading sensor ON time, and an unloading sensor ON time. The production information can also include an asset's cycle time. The cycle time can, for example, represent a period between two sequential bucket dumps or the time it takes a machine to fully load and fully unload. In general, the cycle can be the measurement of time between two of the same events by the asset that can be sensed. The information collected in the utilization area can include fuel efficiency, a number and durations of idle periods, and working time of the asset. The information collected in the maintenance area can include a record of the asset maintenance history. The information collected in the health area can include the current health of the asset obtained by analyzing electronic controller modules on the asset such as fault and alarm data. A monitoring system can be utilized to collect the information in the production, utilization, maintenance, and health of the asset. A filtering module can remove erroneous data.

The monitoring system can use a position navigation satellite system, e.g., the Global Positioning System (GPS), other satellite-based positioning system, or a cellular triangulation system to determine location of the asset. The information collected by the monitoring system can include the location, alarms, faults, operational machine data, operator performance, fuel efficiency, production statistics, preventive maintenance schedule, and utilization times of the asset.

The monitoring system can also include a monitoring device and sensors installed at various locations on the asset or where the asset will travel. The sensors can measure loading and unloading operations associated with the asset, for example, excavators, haul trucks, or loaders. In some example embodiments, the asset is a mobile structure or fixed structures such as crushers, conveyors, or buildings. To communicate an event to the monitoring device, the sensors can utilize wires or a short range radio communications protocol (e.g., IEEE 802.15.4, 802.11.X or other short range communication devices). Relays can be utilized to regulate the information communicated by the sensors to the monitoring device. The relays can act as filters to convey data at a time when the data is known to be valid.

The monitoring system can also receive data from third-party sources that are not integrated in the asset being monitored but are associated with the asset. In an example, an operator is assigned to an asset, e.g., a dump truck that requires a specific operator's license. The operator can have a mobile electronic device, e.g., a mobile phone or other communication device, which can be used to collect further information about the asset. The electronic device can include a navigational position system that can provide the position of the device, and hence, the asset at any given time. Other data can be provided by the electronic device such as audio, video, text input, emails, messaging, directed input through instructions stored in the memory on the device and executed by a processor.

For assets that utilize a hydraulic Electronic Control Module (ECM), an event (e.g., a door or bucket closing or opening) can be detected by monitoring the electronic circuits, serial communications, and/or a bus of the asset to determine when the operator engages the corresponding control. However, when the asset does not include the hydraulic ECM, hydraulic pressure switches, or a device similar in nature, can be installed to sense activation or operation. Thereafter, events may be detected by monitoring changes in the system pressure of the asset. Since such events can include temporary movements, relays can be utilized to filter out false or temporary movements.

The monitoring system can further include a transceiver coupled to an antenna to transmit and receive the information from a monitoring system service provider via cellular or satellite networks. In an example, the monitoring system sends the information over short range wireless communication to a router connected to a computer system such as the Internet. In some example embodiments, data can be stored on the monitoring system for a period of time until it does have communication links to communication systems, e.g., wireless connections, cell coverage, etc. Upon receipt of the information, the monitoring system service provider can make the information collected by the monitoring system available to third party software applications via an open architecture permitting access of the information over an electronic or electromagnetic network (e.g., the Internet).

A monitoring system processor can access the monitoring system service provider over a network using a network protocol (e.g., Web Services) and pull the information. The monitoring system processor can perform an intelligent analysis of the information. The monitoring system processor can apply information processing rules to the data to filter false information from the database and from issued reports. For example, any reported loading events that occur while the asset is in the warm-up phase can be eliminated as false. More broadly stated, at certain times and/or locations certain events cannot occur. In some example embodiments, invalid loading and unloading events can be eliminated by determining that at the time of the reported events, the asset was not present at the respective job site. In some example embodiments, the processor can ensure that each loading event is followed by an unloading event and vice versa.

Invalid loading events can also be eliminated by determining that an asset has not moved between the events and/or by determining that too little time elapsed between the consecutive loading events. Various filter values can be associated with particular events and particular types and locations of the asset. The filters can be adjusted by a user per each different type of the asset. The information can be processed and sent to other software system for interpretations and analysis in the near real-time. The monitoring system processor can create one or more of customized reports, which can be accessed via a web interface application or forwarded to a customer in the body of or as an email attachment. The reports can be utilized by the customer to enhance productivity levels of the asset.

A customer can provide target information, which is incorporated into the reports. This target information can be updated by the customer periodically. The targets can be updated through a computer network. Target information is detailed goals or "targets" a customer wants to obtain each day, week, or customized length of time. A report can compare actual activity of the asset to the target information provided by the customer and color-code the report results based on a custom defined set of criteria (e.g. 60% 80%, 90% of target). In some reports, assets can be automatically grouped by a job site based on the intelligence built into the processor or monitoring system. Geo-fencing can be automatically created when an asset is moved to another site based on certain predetermined parameters. Users are permitted to enter geo-fence coordinates and be identified when entering or leaving a geo-fence boundary. The processor can generate new sites for the user automatically based upon custom criteria (e.g. 5 mile radius, 10 rectangular area, polygon areas, or other areas).

In some example embodiments, specific site data entered by the customer can be incorporated into the report to create a relationship. For example, an asset, such as a scraper, completes 111 loads during a certain time period (1 day). The target data provided by the customer has a goal of 85 loads per day. This data permits the monitoring system processor to interpret the meaning of the information collected by the monitoring system in the context of various goals and/or benchmarks set by the customer. A report generated for the customer can illustrate that the scraper has exceeded its goal for the day and, therefore, was successful, i.e., profitable or efficient. The customer can also utilize the reports to understand various patterns of his asset. Periodic results from the processing performed by the monitoring system processor can be stored in a database. Thereafter, the results can be utilized for trend analysis over time to help improve field operations.

The reports are presented in a precise, organized, and clear form without a need for additional resources for analysis of the information related to operations of an asset. The reports can be delivered electronically, for example, by email, internet, text, wireless, mobile device communication, computer communication, or combinations thereof. In some example embodiments, the reports provided to the customer can include a management report summarizing the information included in other reports or generally available. Other reports can relate to more specific areas of information, such as production, utilization, maintenance, and health of the asset.

The reports provided to the customer can help the customer to understand costs associated with operations of an asset and identify ways to increase production and efficiency. Based on the reports, business decisions can be developed to help improve the overall performance of the asset or the operator of the asset. A production report for an asset can include, but is not limited to, cycle times; number of loads per day, amount of material moved each day, machine hours, and machine costs. A utilization report for an asset can include number of hours the machine has been shutdown, hours idling, hours working, how much fuel has been used, and how fuel-efficient the machine is. A maintenance report can include machine hours, time of the next service, the type of service due next, the location of the machine, services needed to be performed, and parts necessary. A maintenance history report can also indicate what maintenance was performed, who performed the maintenance, when the maintenance was performed, and what parts and costs were associated with the maintenance A health report can include information related to running of the asset, alarms, faults, trouble codes, and issues needed to be resolved. Periodic results from the processing performed by the monitoring system processor can be stored in a database. Thereafter, the results can be utilized for trend analysis over time to help improve field operations. An example network, within which an asset information reporting can be implemented, is illustrated in FIG. 1.

The reports can be generated in essential real-time and provided at the worksite, for example, on a mobile electronic device.

FIG. 1A illustrates an example environment 100, within which asset information reporting can be implemented. As shown in FIG. 1A, the example environment 100 comprises an asset 120, which can, in turn, include an installed monitoring system 200. The monitoring system 200 can collects, stores, receives, (and possibly processes) and transmits various information related to the positional and operational data of the asset 120. The monitoring system 200 can integrate a GPS transceiver, cellular/satellite transceiver, local wireless technology, and/or various computing technologies into a single mobile positioning and communication system. The monitoring system 200 can send position coordinates, such as GPS data coordinates and sensor events, and messages from the asset 120 to a monitoring system service provider 150 running software specifically designed to process this type of information. The monitoring system 200 can process information and make decisions on intelligent reporting of data that is to be collected and reported. The monitoring system 200 can also receive messages sent from the monitoring system service provider 150.

The environment 100 can include a satellite network 140 and/or a cellular network 130, both of which can be utilized for transmitting and receiving positional and operational data to the monitoring system 200. The network 130 can also be a short range wireless network used by computer systems. The satellite network 140 and/or the cellular network 130 can also receive and transmit the positional and operational data from a monitoring system service provider 150. The monitoring system service provider 150 can include dedicated circuitry or a general purpose computer configurable to make the information collected at the monitoring system 200 available through an open architecture interface, such as an Application Programming Interface (API). The environment 100 can also include a computer network 110. The network 110 can be a network of data processing nodes that are interconnected for the purpose of data communication (e.g., a global computer network, such as the Internet).

The monitoring system provider 150 is communicatively coupled to the network 110. A monitoring system processor 300, illustrated within the environment 100, can be communicatively coupled to the network 110 as well. The monitoring system processor 300 can be utilized to access and pull the positional and operational data associated with the asset 120 via the open architecture interface. Various communication protocols (e.g., Web Services) can be utilized in the communications occurring between the monitoring system processor 300 and the monitoring system service provider 150. The monitoring system service provider 150 can utilize telematics and intelligent data processing as well as software to make the information available via the network 110.

While illustrated as two separated systems, in an example, the monitoring system 200 and the monitoring system processor 300 can be integrated and communication between the two systems occur as an asset that is being monitored.

The monitoring system processor 300 can be communicatively coupled to a database 310, in which the monitoring system processor 300 may periodically store results after processing of the information received from the monitoring system provider 150. The monitoring system processor 300 can includes various modules, discussed in more detail below with reference to FIG. 3. The modules of the monitoring system processor 300 can be utilized to perform various operations discussed in more detail with reference to FIGS. 4A and 4B.

The monitoring system processor 300 is optionally associated with an operator 170 operating the monitoring system processor 300 via a computer 160. The computer 160 can include a Graphical User Interface (GUI) facilitating display and manipulation of the monitoring system processor 300. The computer 160 can also enable the operator 170 to view and manipulate reports 182 that can be used to manage and monitor one or more of the assets associated with the authorized user. The monitor can be remote and the graphics being displayed can be over a computer network.

The authorized user can receive real-time reports related to the asset usage, performance, and location. Using detailed map views, the authorized user can see up-to-date data related to location of the asset 120. The reports 182 can include a production report. The production report, for example, can detail number of loads, cycle times, and amount of material moved by the asset 120. The reports 182 can include a utilization report. The utilization report, for example, can detail fuel efficiency, idle and working time of the asset 120. The reports 182 can also include a maintenance report. The maintenance report can include a record of the asset 120 maintenance history. The reports 182 can also include a health report. The health report can include the current health of the asset 120 by analyzing faults and alarms.

The monitoring system processor 300 can provide the reports 182 to an authorized user 190 via the network 110. The authorized user 190 can view the reports 182 using a general purpose computer 180 or any other device providing an ability to view the reports 182. In some example embodiments, the monitoring system processor 300 can send copies of the reports 182 to the authorized user 190 attached or embedded in a body of an electronic email. The reports 182 are based on the information initially provided by the monitoring system 200. The monitoring system 200 is described by way of example with reference to FIG. 2.

Figure 1B:
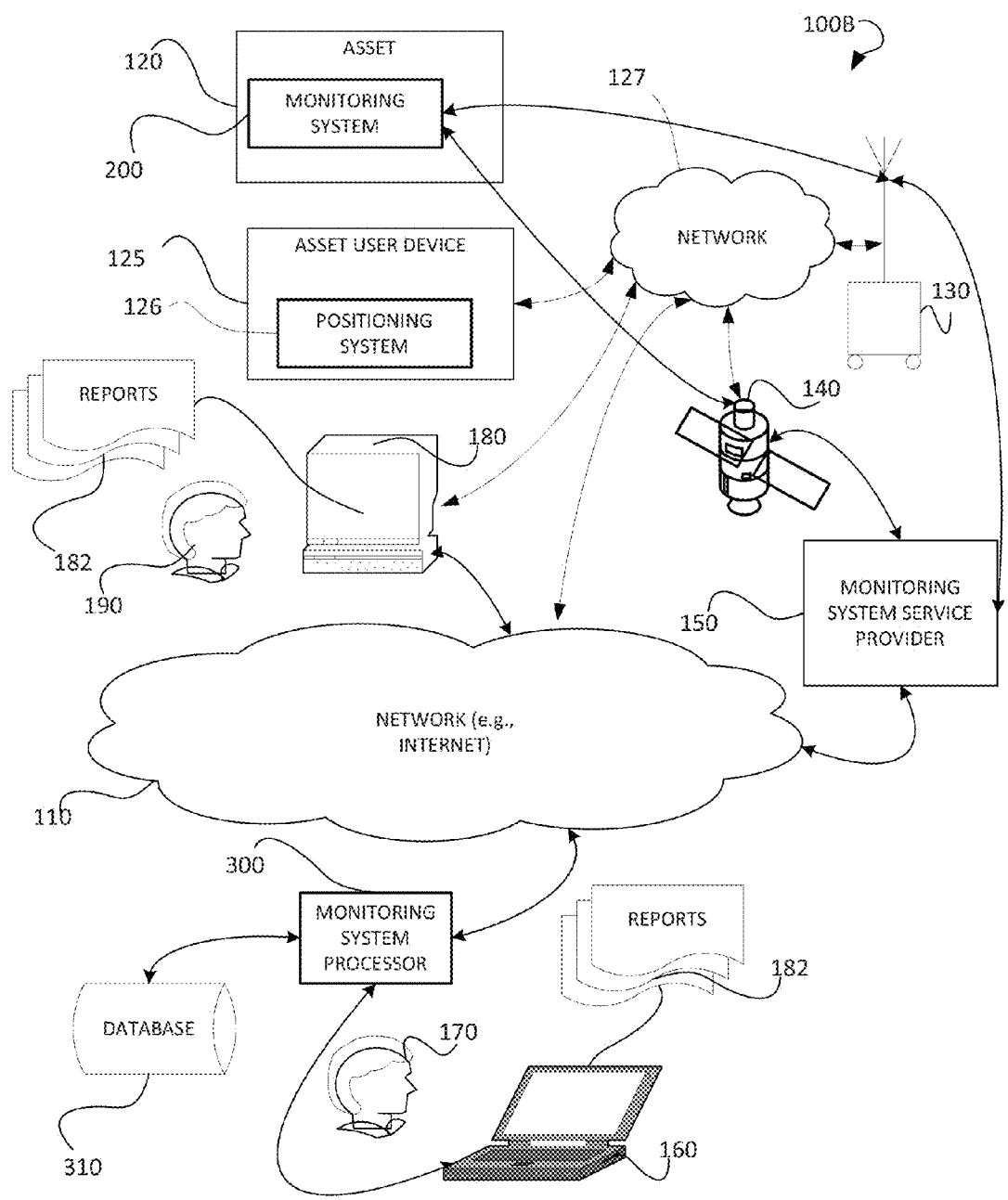
FIG. 1B is a block diagram showing architecture within which asset information reporting is implemented, in accordance with an example embodiment.

FIG. 1B is illustrates an example system 100B, within which asset information reporting can be implemented that is similar to that described herein with reference to FIG. 1A. However, environment 100B includes a further data collection device 125 that can sense and provide data associated with the asset 120. The data collection device 125 can provide the data to a communication network 127, which in turn can communicate the data to at least one of a relay 130, to the monitoring system service provider 150, directly to a user computer 180, monitoring system processor or to the further network 110. In a further example, the data collection device 125 stores data in its memory and then downloads the data when connected to a user device, e.g., when plugged into a user computer for synchronization or battery charging.

System 100B includes an asset device 125 that can provide additional data regarding the asset 120. Asset device 125 can be a mobile device that is physically separate from the asset 120 but can provide additional data regarding the asset. Asset device 125 can include a navigational positioning system 126. For example, the asset device 125 can be the mobile phone of the asset operator. In this case the mobilephone, asset device 125 can determine the location of the device 125 and report it through network 127, which can also include one of more of the computer network 110, the satellite network 140 and/or the cellular network 130, to at least one of the monitoring system service provider 150, the authorized user 190 through the general purpose computer 180 and the monitoring system processor 300. The additional data from the asset device 125 can be used to supplement the data used in processing the received data to produce reports.

The data collection device 125 can be an asset user electronic device that includes a processor and memory. The device 125 can sense or input data relating to the asset 125 for reporting performance and status of the asset. In an example, the device 125 includes a navigational positioning system that tracks the position of the device 125. During certain known times, the device 125 is closely associated with the asset as the operator/user is controlling the asset. The device 125 can then report positional data that can be used to evaluate the performance of the asset. The device 125 can run a program that stores its location at certain times. The time of the location data will also be stored to correlate the location data with operational data from the asset 120.

The data collection device 125 can further execute instructions that provide a template or structured input box to prompt the user to input desired information that can be used to evaluate asset performance. In an example, certain predicted events can be part of the template. Examples of predicted events can be lunch breaks, arrival at a known location (e.g., at event location area 602, FIG. 6), loading event, unloading event, maintenance event, etc. Any data type can be input into the reporting system by the device 125.

The data collection device 125 can further input data for reporting in an unstructured format. Any event or other data that a user believes to be important to the performance can be input from the device into the report system. The device 125 can communicate with other components of the reporting system using other electronic communications, e.g., email, text message, voice mail, etc. The additional data provided by the device 125 can be used to for maintenance tracking, asset mechanical status, asset electrical status, or other performance. The additional data can further document fluid checks or odometer readings. The additional data can also include images of the asset, for example, after an accident or mishap, or routine documentation of the asset according to contractual agreements, e.g., insurance agreement or rental agreement. The third party agreements can be implemented in an application, (i.e., stored and executable instructions), that requests the required data to be input by the user through the device 125.

In an further example, the device 125 can provide data relating to the asset to the user. The data provided to the device 125 can be parts lists, maintenance data, operating instructions, links to acquire reports, data, or templates, or other data. This data can be provided by the monitoring system provider 150 or the monitoring system processor 300 or from third parties through these environment components and communication networks.

The monitoring system provider 150 or processor 300 can filter and/or process the data into reports that can be provided to an end user or owner of the assets. The reports can be populated with data from the device 125 to provide a more robust report and automate asset reporting, maintenance, and other efficient reporting.

Data communication as described in FIGS. 1A and 1B couples the various devices together. The network 110 is preferably the Internet, but can be any network capable of communicating data between devices can be used with the present system. In addition to the Internet, suitable networks can also include or interface with any one or more of, for instance, an local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. In an example, the network 127 can be capable of communicating using any one or a plurality of the above communication means discussed herein.

Figure 2:
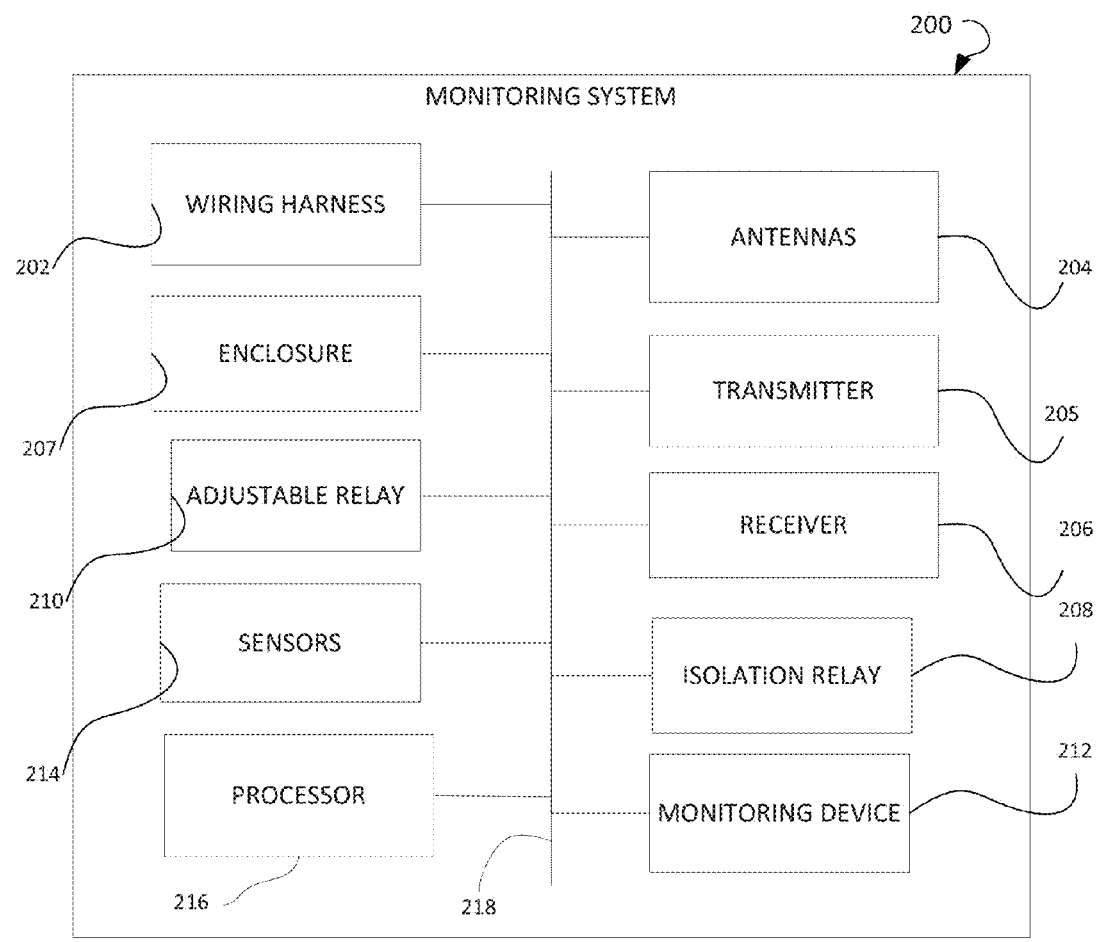
FIG. 2 is a block diagram showing a monitoring system, in accordance with an example embodiment.

FIG. 2 is a block diagram showing a monitoring system 200, in accordance with an example embodiment. The monitoring system 200 can includes a wiring harness 202, an antenna 204, a transmitter 205, a receiver 206 an enclosure 207, an isolation relay 208, an adjustable relay 210, a monitoring device 212, sensor(s) 214, and processor(s) 216. The monitoring system 200 can be a stand-alone component utilized to determine and communicate asset status, which can include position, speed, and direction. The monitoring system 200 can also interface with the sensors 214 and external accessories as part of an on-board system that monitors asset's performance. Events being monitored include an ignition status, a distance moved since last valid loading or unloading event, a time elapsed since last valid loading or unloading event, a loading sensor "on" time and "off" time, an unloading sensor "on" time and "off" time.

The transmitter 205 and the receiver 206 are electrically connected to the antenna 204 for respectively sends in receiving over the air electromagnetic signals. The transmitter 205 includes electronic circuits to receive an input signal from the antenna 204. The transmitter 205 can include a power supply, an oscillator, a modulator, and amplifiers for specific frequencies. The modulator adds signal information onto a carrier frequency, which is then broadcast from the antenna 204. The receiver 206 can include electronic filters to separate a desired radio signal from noise and other signals sensed by the antenna 204. The receiver 206 amplifies the desired signal to a level suitable for further electronic processing, e.g., demodulation and decoding, and signal processing. While the transmitter 205 and the receiver 206 are shown as separate devices in FIG. 2, it will be recognized that a transceiver, a device that includes circuits for both sending and receiving is within the scope of the present disclosure.

The monitoring device 212 can include firmware, which supports automated monitoring, and reporting of the asset 120 activities and status. For example, the monitoring device 212 can detect an alert and cause the antenna 204 to send the alert to the monitoring system provider 150. The alert sent to the monitoring system provider 150 can is, in an example, accompanied by a location and operational data of the asset 120. Information related to other events can be detected, stored, and transmitted by the monitoring device 212. The monitoring device 212 can automatically report arrival or departure of the asset 120 from a job or home site location. The monitoring device 212 can also record and transmit various machine utilization parameters, such as a time and distance traveled. The monitoring device 212 can be mounted on the asset 120 and does not require operator access or involvement.

The monitoring device 212 can include processors that execute applications, which are instructions stored on computer readable media. The local processing capability of the monitoring can perform simple and complex logic, including but not limited to, power management, communication management, data storage, encrypted communication, and/or real time clock processing and management.

The wiring harness 202 includes, in an example, a string of cables and/or wires, which transmit electrical signals or operating currents between other components of the monitoring system 200. By binding wires and cables into a cable harness, the wires and cables are secured against the adverse effects of vibrations, abrasions, and moisture. By constricting the wires into a non-flexing bundle, usage of space is optimized and the risk of a short circuit is decreased. The wires bundled in the wiring harness 202 can be connected to various parts of the asset 120 to transmit various signals from sensors 214, activators (not shown), pumps (not shown), or other asset components to the monitoring system 200.

The sensor(s) 214 can be installed at various locations of the asset 120. The sensors 214 can measure loading and unloading operations associated with the assets such as excavators, haul trucks, loaders. To communicate the event to the monitoring device 212, the sensors 214 can also utilize short range radio communications protocol (e.g., IEEE 802.15.X, IEEE 802.15.4, or other short range wireless technologies). A sensor 214 can be a fuel air mixture sensor. A sensor 214 can monitor motor exhaust for various components of the exhaust gas. A sensor 214 can detect oil quality or oil pressure or time since last oil change. A sensor 214 can measure engine speed (rpm) or hours of operation. A sensor 214 can measure fuel level. Other fault detection can be sensed by sensor 214.

For example, in a scraper the wires can be utilized to transmit electrical signals when the apron opens and/or closes and ejector door extends and/or retracts. The wires can also be utilized to transmit signal back to the monitoring device 212 when, for example, the operator of the asset 120 engages various controls. Thus, the components of the monitoring system 200 can be combined to enable the transmission of GPS position data, events, alarms, and sensor inputs to the monitoring system provider 150 via a satellite and/or cellular network. Data can be stored by the monitoring system 200 for a period of time until a transmission can be made.

The sensor 214 can also be used to determine utilization of the asset. The sensor 214 can sense the movement of part of the asset. In an example, the part is different that the prime mover, e.g., a motor. The part can be a lift mechanism, an arm or other part that is not in a certain determinable position when the asset is in use. In an example, the sensor 214 can be a contact sensor that determines if part of the asset is not in a home or rest, i.e., non-utilization position. In a further example, the sensor senses when a person is on the asset, controlling the asset or at a specific location. The sensor 214 can be switch that must be activated by the user for the asset to work. When activated, the sensor 214 senses an utilization event.

The isolation relay 208 and the adjustable relay 210 can be utilized to regulate the information transmitted and received from the monitoring device 212. In some example embodiments, only the adjustable relay 210 is needed to provide a signal-to-ground contact closure while monitoring the transmission between the monitoring system 200 and the monitoring system provider 150.

The isolation relay 208 can allow a determination to be made as to whether the asset 120 is operational. All of the example components of the monitoring system 200 can be provided inside the enclosure 207. The enclosure 207 is, in an example, a metal housing that is sealed against dirt, grime, dust, and moisture that are generated at building construction sites, road construction sites, and in agriculture. It will be noted that the monitoring system 200 is not bound to a particular monitoring system provider. Any hardware that can successfully interface with the monitoring system 200 can be utilized as the monitoring system provider 150. The monitoring system 200 can, in some example embodiments, be specifically designed for the asset 120.

The processor(s) 216 operate to control various operations of the asset. In an example, the processor 216 is an electronic device to process received signals and output control signals to control operation of a component of the asset. An example of a processor 216 is an engine controller. Processors 216 can be microcontrollers and/or electronic control units (ECUs). Electronic control units can be made from programmable logic controllers and/or programmable gate arrays. In an example, a main processor 216 is provided and it controls other processors in a master/slave configurations. Processor(s) 216 can further operate without a master processor. In operation, the processor 216 receives a sensed signal from a sensor 214 regarding the operation of the asset. The processor 216 applies stored instructions to the sensed data and outputs a control signal to a component of the asset or stores the operational data in a memory.

A bus 218 provides a data communication path between the devices 202-216. In an example, bus 218 is a serial bus, e.g., Modbus or ethernet. The bus 218 can also be a controller area network, e.g., CAN-bus, CAN-open, SAE J1939 CAN-bus. A controller area network is a multi-master broadcast serial bus standard for connecting electronic control units (ECUs), such as a processor 216, to other electronic devices.

Figure 3:
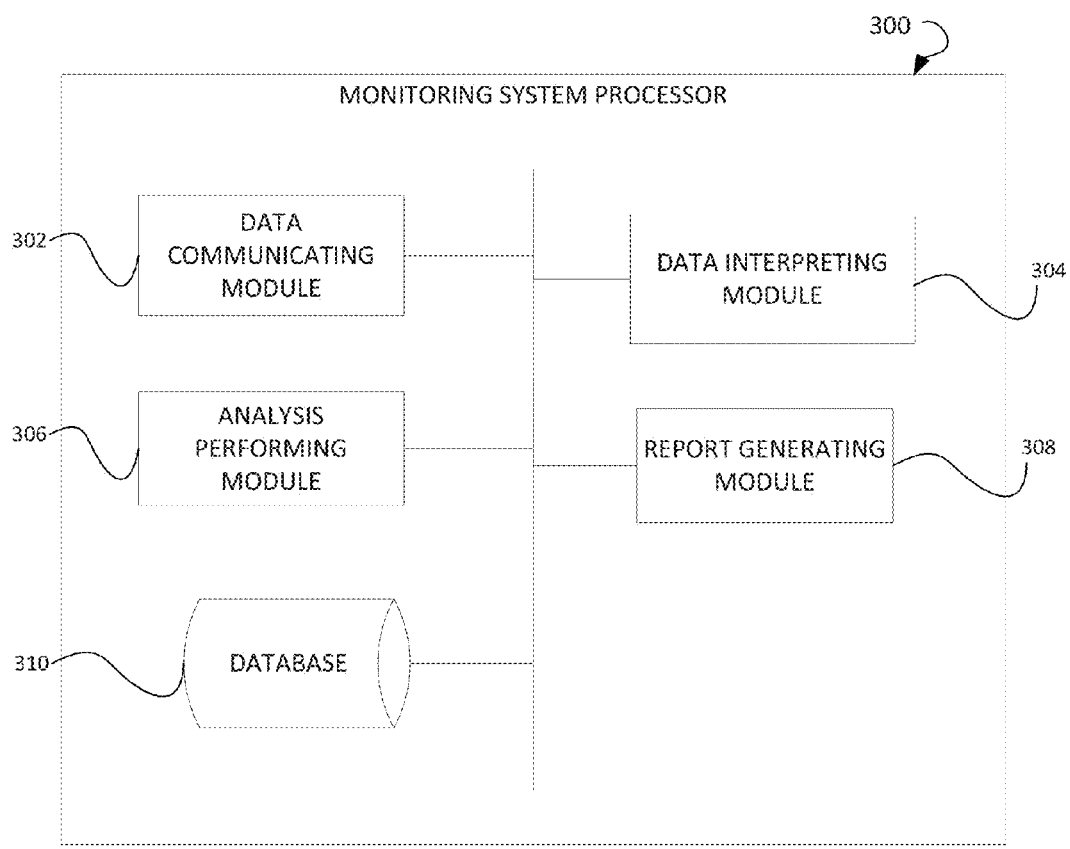
FIG. 3 is a block diagram showing a monitoring system processor, in accordance with an example embodiment.

FIG. 3 is a block diagram showing a monitoring system processor 300, in accordance with an example embodiment. The monitoring system processor 300 can include, in some example embodiments, a data communication module 302, a data interpreting module 304, an analysis performing module 306, a report generator module 308, and the database 310. The operations of the modules and the monitoring system processor 300 are explained in more detail within the context of example methods for asset information reporting illustrated in FIGS. 4A and 4B.

Figure 4A:
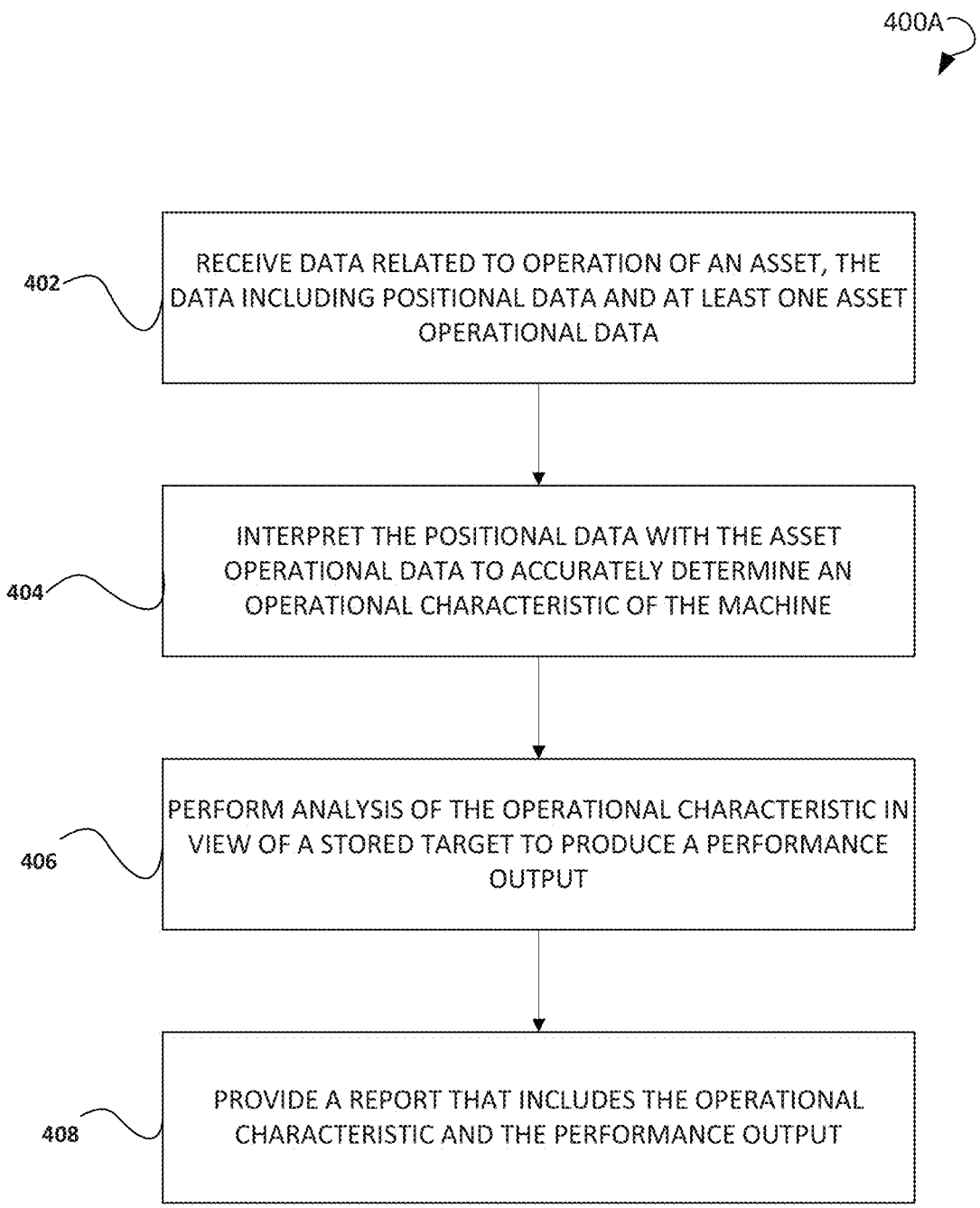
FIG. 4A is a flow diagram showing a method for asset information reporting, in accordance with an example embodiment.

FIG. 4A is a process flow diagram illustrating a method for asset information reporting 400A, in accordance with an example embodiment. The method 400A can be performed by processing logic that can comprise hardware (e.g., dedicated logic, programmable logic, microcode, etc.), software (such as software run on a general purpose computer system or a dedicated machine), or a combination of both. In one example embodiment, the processing logic resides at the monitoring system processor 300, illustrated in FIG. 3. The method 400 can be performed by the various modules discussed above with reference to FIG. 3. Each of these modules can comprise processing logic.

As shown in FIG. 4A, the method 400A can commence at operation 402 with the data communication module 302 receiving data related to the operation of the asset 120. The data received by the communication module 302 can include the positional and operational data associated with the asset 120. The positional data can be obtained using the position navigation system, e.g., Global Positioning System (GPS), or a cellular triangulation system by the monitoring system 200 installed on the asset 120 and transmitted to the monitoring system provider 150. The positional and the operational data can be made available over a network from the monitoring system service provider 150 using an appropriate protocol (e.g., Web Services).

Examples of operational data include, but are not limited to, velocity, direction, an ignition key ON event, an ignition key OFF event, a door open event, a door closed event, a location, a fuel efficiency (e.g., fuel burn calculation), an idle time, a production statistics, a preventive maintenance schedule, a maintenance history, a cycle time, a utilization time period, a fault data, and an alarm data. The positional and the operational data can be received via a cellular 130 and/or a satellite network 140 at the monitoring system service provider 150 and then pulled by the monitoring system processor 300.

In some examples described above information can not be transmitted immediately from the monitoring system 200 to the monitoring service provider 150 due to, for example, a temporary unavailability of the satellite 140 and/or the cellular network 130. The monitoring system 200 can store information until communication over one of the networks between the monitoring system 200 and the monitoring system service provider 150 is restored. If the communication is disrupted due to the asset 120 moving out of the coverage area, the monitoring system 200 can be removed from the asset 120 and brought back into the coverage area. Alternatively, the asset 120 can be moved into the coverage area. Once the communications are restored, the monitoring system 200 can transmit information to the monitoring service provider 150.

At operation 404, the data interpreting module 304 of the monitoring system processor 300 can interpret the positional data in view of the operational data to accurately determine characteristics of the asset 120. At operation 406, the data interpreting module 304 of the monitoring system processor 300 can perform analysis of the operational characteristic in view of a stored target to produce a performance output.

The stored target can be related to the asset 120 and/or to a site specific data related. In some example embodiments, a relationship between the performance output and the site specific data can be included in the reports 182.

The data interpreting module 304 of the monitoring system processor 300 can intelligently interpret the positional data of the asset 120 in view of the operational data. Any event having a low probability of occurring in view of the positional data associated with the asset 120 or in view of one or more of other events occurring in the same or nearly the same time, can be eliminated as false. For example, the data analyzing module 306 can determine that at the time of the reported loading event, the asset 120 was not operational or operational for a period of time which is too short for the loading to occur.

Thus, the reported loading event can be eliminate as false, if the data related to the ignition status shows that the asset was still in the warm-up phase. In another example embodiment, the data analyzing module 306 can compare the performance data of the asset to the positional data to determine whether, at the time of the reported events, the asset was present at the respective job site. If the asset was not present at the respective job site, the reported event can be eliminated as false. In some example embodiments, the data analyzing module 306 can analyze the performance data to ensure that each loading event is followed by an unloading event and vice versa.

In some example embodiments, invalid loading events can also be eliminated when a determination is made by the data analyzing module 306 comparing the performance data of the asset to the positional data, that asset has not moved between two events. Furthermore, invalid loading events can also be eliminated when the analyzing module 306 determines that the time period elapsed between the consecutive loading events is less that a predetermined time period.

It will be understood that various filter values can be associated with particular events and particular type and location of the asset. The filters can be adjusted by a user per each different asset. It will be further understood, that operators of the monitoring data processor 300 or a customer can be provided with an ability to set other criteria to intelligently analyze performance data of the asset 120. The information can be processed and sent for interpretations and analysis in near real-time.

At operation 408, a report generating module 308 of the monitoring system processor 300 can provide a report that includes the operational characteristic and the performance output. In some example embodiments, the report can be accessed by an authorized user via a computer interface. In some other example embodiments a digital copy of the report can be sent to a predetermined user via an electronic mail. The report can summarize the performance output of the asset 120 or be related to a specific area of operational characteristics. For example, the report can be related to production data associated with the asset 120.

The report related to the production data can include, but is not limited to, cycle times, number of loads, an amount of material moved, time of operation, and costs associated with the asset 120. The report can be related to utilization data associated with the asset. The report related to the utilization data can include an idle time, an amount of fuel consumed and an amount of fuel remaining in the asset. The report can be related to maintenance data associated with the asset. The report related to the maintenance data can include a date of an upcoming service, a type of the upcoming service, a location of the asset, and a part associated with the upcoming service. The report can also be related to health data associated with the asset. The report related to the health data associated with the asset can include an alarm and a fault associated with the asset 120.

Databases, stored at either at the operator's computer 160 or the authorized user's computer 180, as well as the monitoring system database 310 can store the reports generated according to the methods and systems described herein. The databases are stored on tangible computer readable media, such are magnetic media, electronic storage devices, optical storage devices, etc.

Figure 4B:
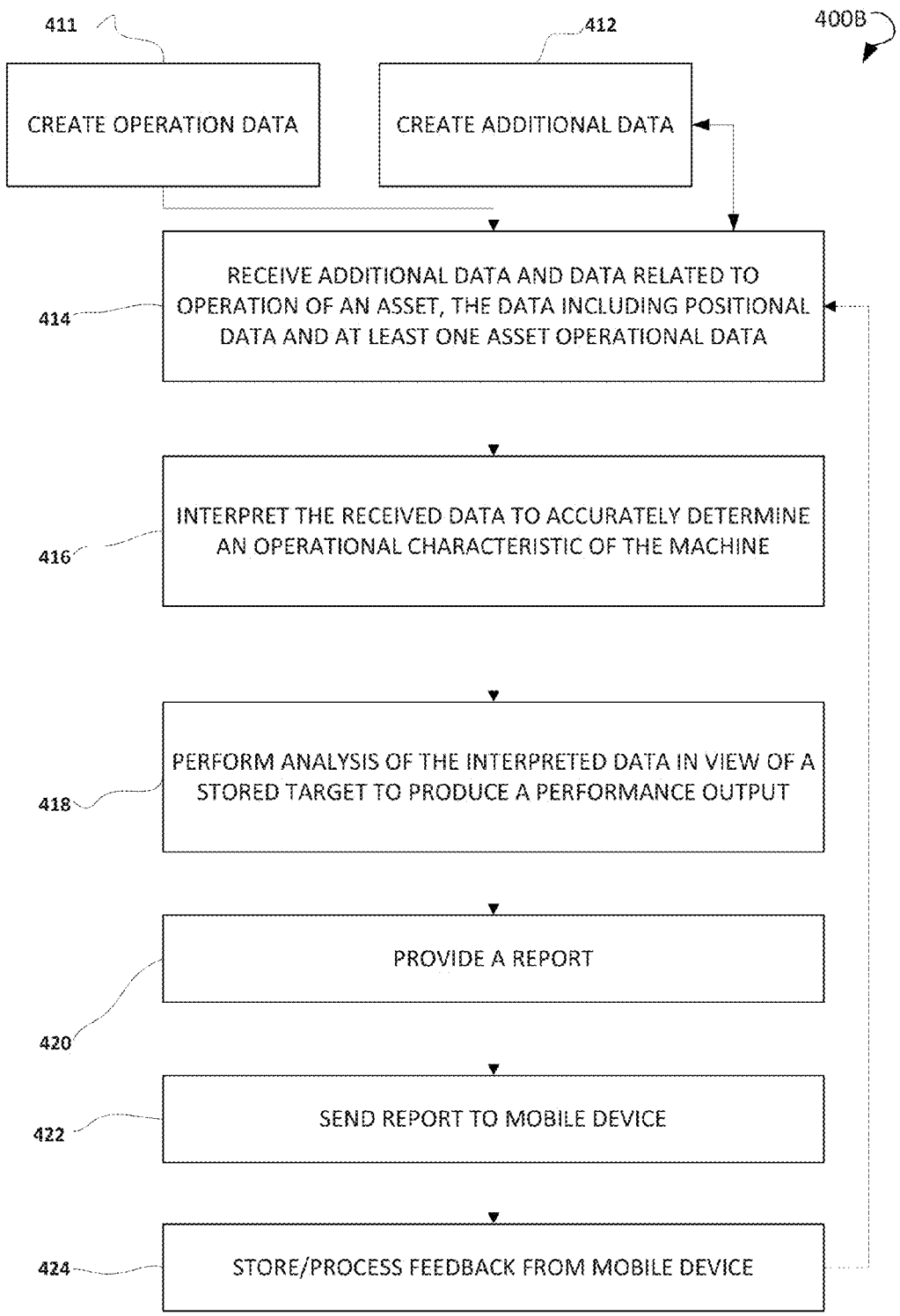
FIG. 4B is a flow diagram showing a method for asset information reporting, in accordance with an example embodiment.

FIG. 4B is a process flow diagram illustrating a method for asset information reporting 400B, in accordance with an example embodiment. Reporting method 400B is similar to reporting method 400A with a few additional steps.

At 411, operational data is created. The operational data includes data that directly relates to operation of the asset. Examples of operational data that may be described in greater detail in this document include running time, hydraulic activation, door opening(s), door closing(s), loading events, engine operation, among others.

At 412, additional data is sensed separate from the operational data. In an example, the additional data is positional data that can be sensed and reported by a device associated with the asset but physically separate from the asset per se, e.g., a mobile phone of the asset operator. In an example, the additional data include position data and time data. The optional data can be automatically sent from the device, e.g., device 125 of FIG. 1B.

At 414, the additional data and the data relating to the operation of the asset are received. The data can be received from two different communication routes as the additional data is created by a device physically or electrically separate from the asset. The combined operational data and the additional data will include the data needed for processing, interpretation, analysis, and reporting as described in this document.

At 416, data interpretation occurs on the received data of step 414. Similar modules, hardware, and instructions as described above with regard to step 404 can be used.

At 418, interpreted data is analyzed to produce asset performance output. Similar modules, hardware, and instructions as described above with regard to step 406 can be used.

At 408, a report is created and provided that includes the performance output. Similar modules, hardware, and instructions as described above with regard to step 408 can be used.

At 422, an optional step is described. The generated report can be provided to a mobile device, e.g., the device that created the additional data of step 412. Accordingly, the operator of the asset can receive reports at an electronic device, e.g., device 125.

At 424, a further optional step is described. The electronic device can send feedback data from the mobile device back into the monitoring system. This data can be feedback into the receiving, interpreting, analyzing, reporting loop (414, 416, 418, 420) to produce a report with further information. In an example, the mobile device of a user receives a report and queries the user for additional information, e.g., image of current location, image of job site, location of asset, etc. This request can be an electronic form or template or other visual indicator for the displayed on the mobile device.

Figure 5:
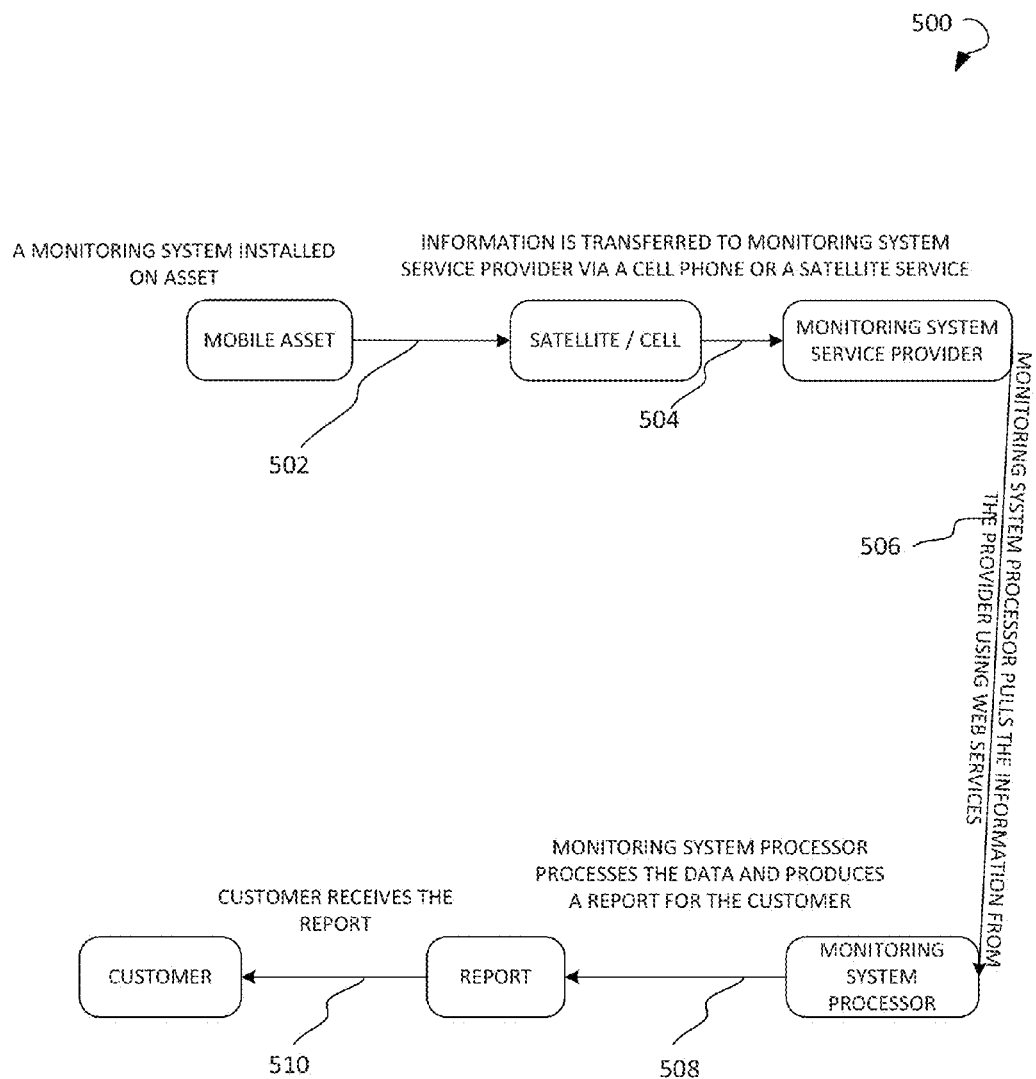
FIG. 5 is a flow diagram illustrating data collection analysis and reporting, in accordance with an example embodiment.

FIG. 5 is a flow diagram illustrating data collection analysis and reporting method 500, in accordance with an example embodiment. The method can start with the monitoring system 200 being installed on the asset 120 at operation 502. For the asset that utilizes a hydraulic Electronic Control Module (ECM), an event (e.g., a door closing) can be detected by monitoring the electronic circuits of the asset to determine when the operator engaged the corresponding control. However, when the asset does not include a hydraulic ECM, hydraulic pressure switches, or a device similar in nature, can be installed. Thereafter, events may be detected by monitoring the changes in the system pressure of the asset. Since such events can include temporary movements, relays can be utilized to filter out false or temporary movements.

The monitoring system 200 can collect information based on certain criteria provided by the monitoring system service provider 150 and hardware configuration of the monitoring system 200 and the asset 200. At operation 504, the information collected by the monitoring system 200 can be transferred to the monitoring system service provider 150 via the satellite network 140 or/and cellular network 130 and/or a direct communication. At operation 506 the monitoring system processor 300 can pull the information from the monitoring system provider 150 using, for example, a Web Service protocol. At operation 508, the monitoring system processor can process the information pulled from the monitoring system provider 150 and produce a report for an authorized user (e.g., a customer).

In an example, the asset 120 can include dirt moving equipment, such as a scraper. The scraper can include various controls, such as apron and ejector doors controls to move dirt. To record production information or to calculate cycle times, both timing of the apron and ejector doors operations can be recorded and processed.

In a typical scraper loading scenario, the apron can be initially raised to permit the bowl to scrape across the ground and all of the material to accumulate. The ejector is retracted fully to allow the maximum amount of material to be loaded. After the asset is loaded, the apron can be closed to secure the material from falling out on the trip to the unloading area. During the loading cycle, the apron door can be monitored and when the last apron movement is completed, a "Done Loading" event can be recorded and stored for future analysis. When the scraper gets to the unloading area, the operator can raise the apron and begin moving the ejector door forward to push the material out of the scraper and onto the ground. Once the ejector door stops extending, an event can be recorded as the "Done Unloading" event. By analyzing these two events, the following information can be calculated: a round trip distance, distance to load, distance to unload, a number of loads, average travel time to between load and unload, average travel time to load area and unload area and average cycle time.

Figure 6:
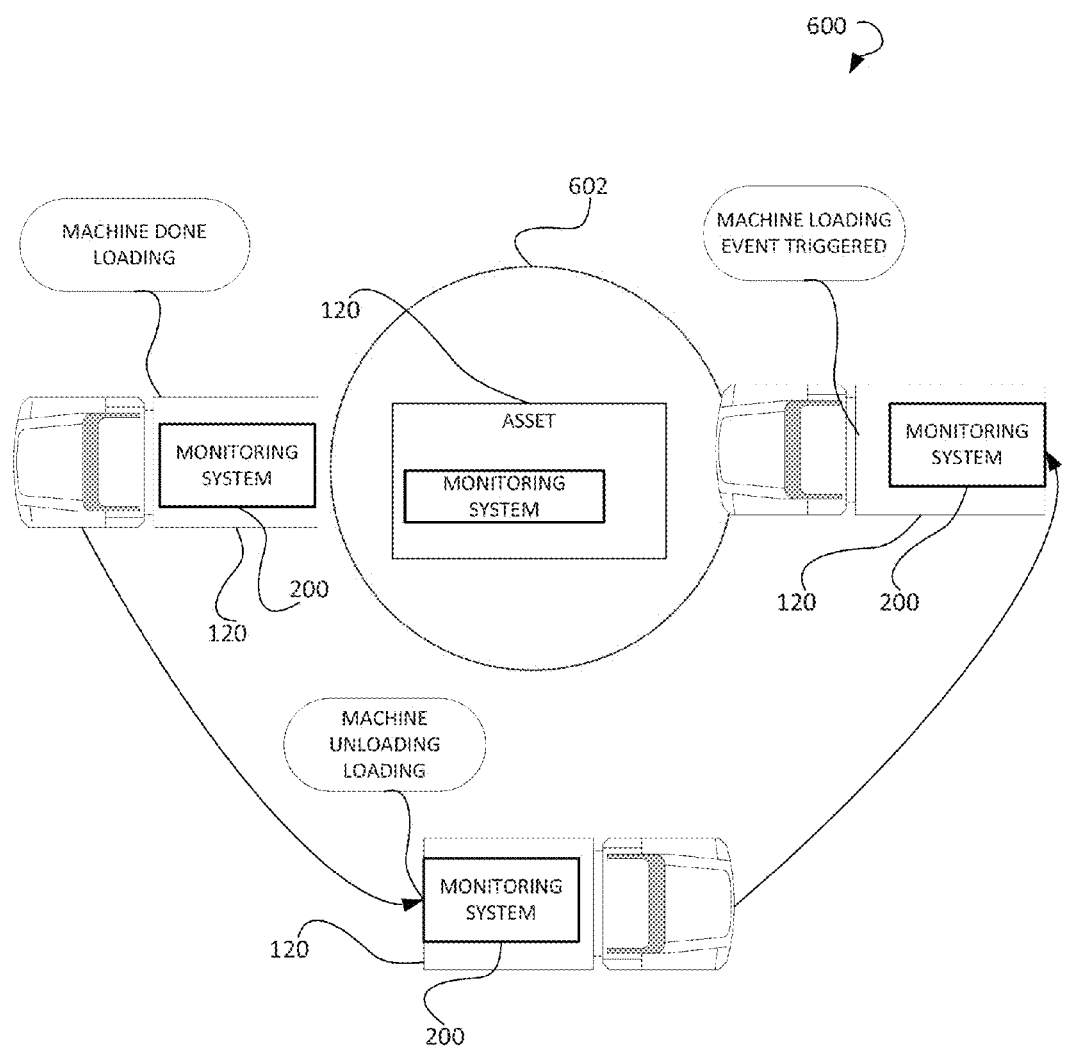
FIG. 6 is a block diagram illustrating monitoring system triggering events, in accordance with an example embodiment.

FIG. 6 is a block diagram illustrating monitoring system triggering events 600, in accordance with an example embodiment. In some example embodiments, the asset (e.g., truck) can utilize an electronic sensor to measure when the dump box or bucket is retracted. This can signify the completion of a cycle or unloading phase. A proximity sensor (not shown) can be utilized to determine the start of the machine loading event. The proximity sensor can be installed at the base of the excavator to detect when another asset (e.g., a truck) is within a predetermined distance from the location of the excavator. A circumference 602 of FIG. 6 illustrates the area, upon entrance of which, the machine event can be triggered or identified as a valid event. This event can remain active until the truck leaves the area within the circumference 602. Other sensed events can also be indicated as valid as the asset, illustrated here as a truck, is positively located in the area. Leaving the area can trigger a "Done Loading" event. The proximity sensor can be able to monitor multiple trucks and each truck can be able to go to multiple excavators throughout the day. The proximity sensor can be connected to the monitoring system 200, which in turn communicates the described events to the monitoring service system provider 150. Production logic examples are described in greater detail below with reference to FIGS. 7 and 8.

The area 602 can define a valid event sensing area within which events are sensed that occur to an asset or that the asset itself performs. While only showed as a single area by one circumference 602, it will be understood that two areas could be used, one for a first event, e.g., loading or warm-up, and a second for unloading. Further areas may be defined for other events, e.g., fueling, work-breaks, etc. Different logic rules can be applied to data sensed at each area to validate the data and remove faulty or erroneous data. The filtering can limit the data to only data at the work site(s). This data can be filtered at the monitoring system 200 or at the monitoring system processor 300 or both. The filtered data can be processed as described herein and provided to the worksite device(s) (e.g., to computing devices 180) and may be in the form of a report 182.

In a further example, the data generated at an asset can be filtered based on the task being performed by the asset 120. In the case where the asset 120 is a truck, it is known where the location of the load event and the location of the unload event. These events will only be valid in these locations and for these given tasks. The assets 120 may further perform different tasks that alter the logic rules that are applied to filter or analysis the data. In an example, the asset 120 may be tasked with hauling sand during one time period, hauling gravel during a second time period, and hauling top soil during a third time period. The location whereat these events may change. Moreover, the asset may travel through other locations that may not be valid for the particular task being performed but are valid for other tasks. The filtering rules must change to reflect the different work locations whereat valid events occur. Moreover, the quantity of material being acted upon by the asset may be different for each task. This must be taken into account when preparing reports.

The assets can further report data relative movement of the assets. In an example, a first asset performs a task that must be complete before a second asset can complete its task. In an example, an asset is a mobile loading device that must load a mobile trucking device before the trucking device can move a load and then dump the load. The position of each asset can be monitored. In the case of a loading device, it's position in the loading area and its position relative to the load receiving device can be sensed. This sensed data can be used to filter data from the load receiving device. For example, if the load receiving device is stationary and repeatedly approached by the loading device, then a sensed unload event would be filtered as invalid data. In an example, the relay that would allow reporting of such an erroneous event can be held in the open position so that any signal communicating an unload event is filtered from the data set and can be discarded or flagged for further investigation. The loading device can produce loading signals that are generated by on-board sensors that sense operation of loading structures. The real-time loading position for the mobile loading device relative to the work site can be sensed as the mobile loading device moves in the work site. This data can be correlated to the load receiving device and used to filter data. The mobile loading device can include sensors to sense its forward and reverse movements, transmission position, position of its loading structures, or cycles of its movement, transmission, or positions The position of its loading structures can be in three dimensional space.

A processing program performing analysis of data at the monitoring system processor 300 can filter out some data and create a report in a format that can be easily understood by an authorized user. In some example embodiments, target values can be used (e.g., number of loads each day, average cycle time, machine cost, revenue per yard) to perform analysis and provide additional analysis in view of the target values. Such report can present clear information of operations performed on a jobsite. Thus, one or more reports generated by the monitoring system processor 300 can provide customers many useful details regarding operations of their assets.

Figure 7:
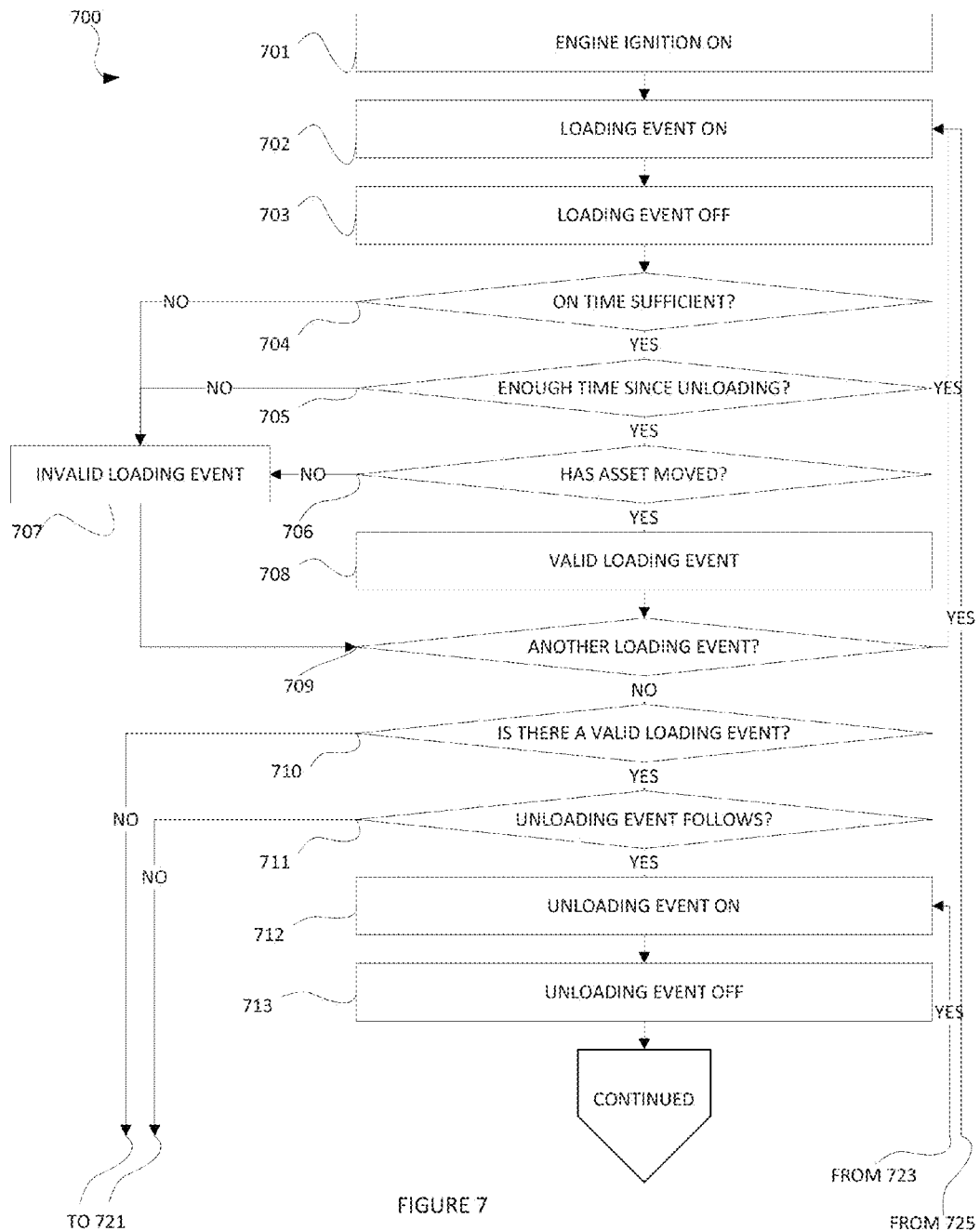
FIG. 7 is the first part of a flow diagram illustrating production logic, in accordance with an example embodiment.

FIG. 7 is the first part of method 700 illustrating production logic, in accordance with an example embodiment. The rules of the production logic can be run upon receiving the data associated with the asset 120 from the monitoring system server provider 150. The output data can be saved to the database 310 and utilized by the reports 182. It will be noted that changing the production rules will not change the existing data. However, the data received subsequent to changing the production rules can be changed. Data related to the worksite of the asset 120 is not determined at the time of processing and is not part of the production logic described. The data related to the worksite can be utilized at a run-time to generate reports.

The method 700 may commence at operation 701 with an operator of the asset 120 turning the ignition key on. The ignition on event can determine the start of the workday. In one example embodiment, a load cycle commences with a valid loading event. A loading sensor can generate a loading on event when the sensor turns on. The ignition on event can be followed by the loading on event at operation 702 and loading off event at operation 703. The loading off event can be generated based on the sensor input.

In the absence of an ignition on event, the first loading event defined by loading on 702 and loading off 703 events can determine the start of the workday. At operation 704, the timings of the loading on and loading off events can be received by the receiving module 302 of the monitoring system processor 300 described above with reference to FIG. 3.

Thereafter, the analysis performing module 306 can calculate the period of time elapsed between these events and determine whether the time is sufficient for a loading to occur. If, the analysis performing module 306 determines at operation 704 that the time period between the loading on event and loading off events is insufficient for a loading to occur, the method will proceed to operation 707, in which the loading event will be declared invalid. In some example embodiments, the operational logic can include a configurable "on time" filter. If the loading sensor is not active for a sufficient time period, the loading event will be considered invalid.

If, on the other hand, the analysis performing module 306 determines that sufficient time has elapsed between the loading on and loading of events, the method can proceed to operation 705. At operation 705, the analysis performing module 306 can determine whether enough time has elapsed since the last unloading event. The operational logic may include a configurable "time since unloading" filter. Thus, if not enough time has elapsed since the last valid unloading event, the loading event will be considered invalid.

Timings of loading and unloading events may be recorded as described above with reference to FIG. 6. If the analysis performing module determines that not enough time has elapsed since the last unloading event the method can proceed to operation 707 where the loading event can be declared invalid. Otherwise, the method can proceed to 706.

At operation 706, the analysis performing module 306, based on the positional data received from the monitoring system 200, may determine whether the asset 120 has moved between the unloading and loading events. The production logic can include configurable "asset movement" filters. If the asset 120 has not moved since the last valid ignition on event or unloading event, the loading event will be considered invalid. The movement data can also be based on the data associated with the odometer feature of the monitoring device 212, which is connected to the asset 120. However, if the odometer resets or stops working, such data may prove to be inaccurate.

If the analysis performing module 306 decides that the asset has not sufficiently moved between the unloading and loading events, the method may proceed to operation 707 where the loading event is declared invalid. Thus, loading events that have been rejected due to on time, time since unloading, or movement filters can be considered invalid and not considered to be a part of a load. If, however, all three above mentioned conditions are satisfied and it is determined that the loading event was performed over a sufficient period of time, the time period between the last unloading and the loading event is sufficient, and that the asset has moved sufficient distance between the unloading and loading events, the loading event can be declared valid at operation 708. In other words, if a loading event is not rejected by the on time, time since unloading, or movement filters it is considered a valid loading event. When multiple consecutive loading events occur, the last valid loading event is considered to be part of the current load.

At operation 709, the monitoring system processor may receive data associated with another loading event, and the process may repeat starting with operation 702. Thus, if the next event after either a valid or invalid loading event is another loading event, then the new loading event validity will be determined by the on time, time since unloading, and movement filters. If, on the other hand, no data associated with another loading event is received at operation 709, then the method may proceed to operation 710. If the filter determines that a valid loading event exists, then the current load may be valid. If, on the other hand, there is no valid loading event, then the current load is not valid.

At operation 710, the analysis performing module 306 may determine whether the loading event was declared invalid at operation 707. If the loading event is declared invalid at operation 707, the method can proceed to operation 721 and the load associated with the loading event will be declared invalid as well. If, on the other hand the loading event is declared valid, the method may proceed to operation 711. A valid load requires both a valid loading event and a valid unloading event. If the valid loading event is not followed by a valid unloading event, the current load is not valid.

At operation 711, the analysis performing module 306 may determine based on the data received from the monitoring system 200 whether the loading event is followed by an unloading event. If it is determined that the loading event is not followed by an unloading event, the method can proceed to operation 721 and the load associated with the loading event is declared invalid. If, on the other hand, the loading event is followed by an unloading even, the method can proceed to operations 712 and 713, in which the data associated with the unloading on and the unloading off events is received by the data communication module 302 of the monitoring system processor 300. An unloading sensor can generate an "unloading on" event when the sensor turns on. An unloading sensor can generate an "unloading off" event when the sensor turns off. Thereafter, the method can proceed to operation 714 shown in FIG. 8.

Figure 8:
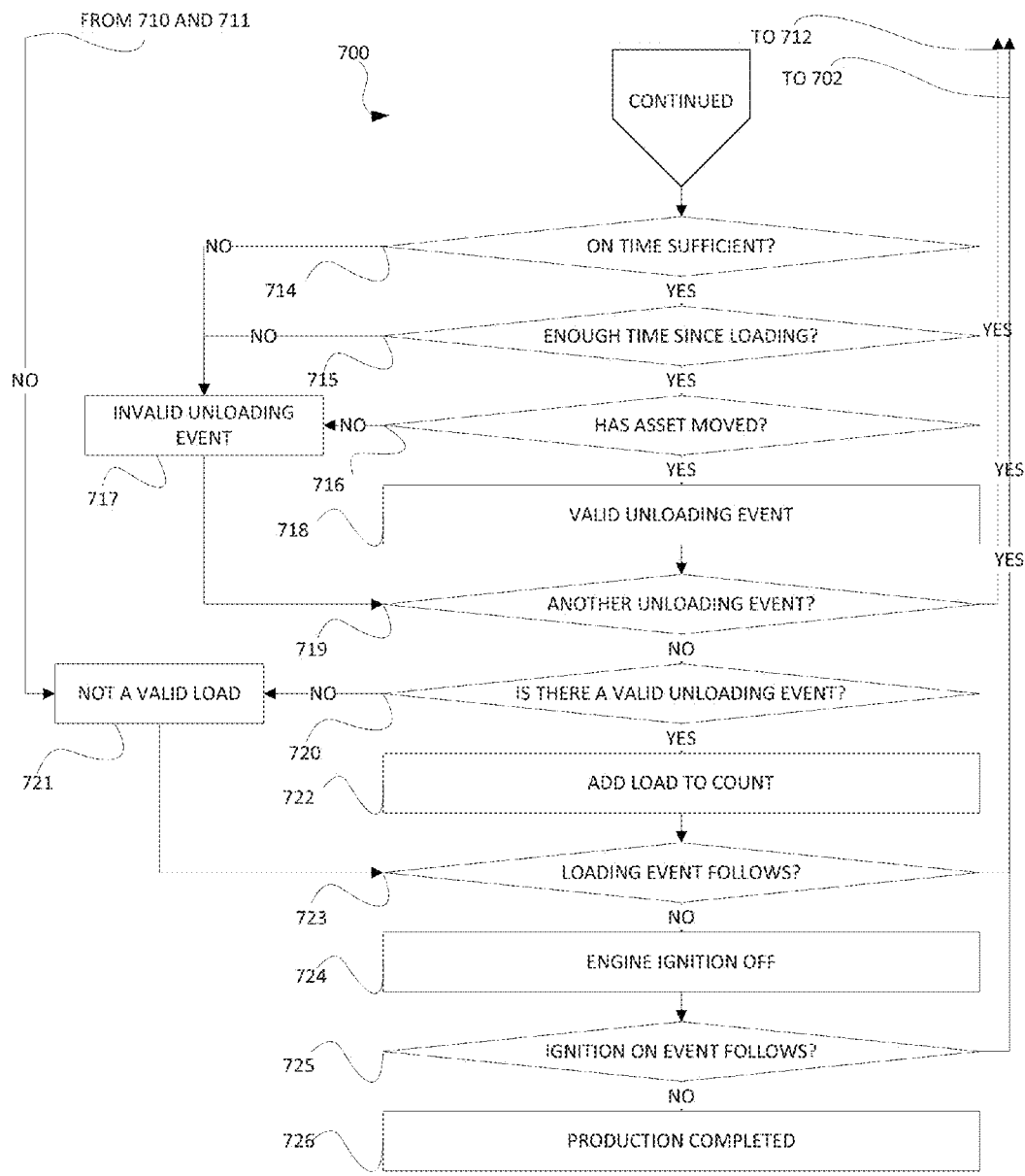
FIG. 8 is the second part of a flow diagram illustrating production logic, in accordance with an example embodiment.

FIG. 8 is the second part of the method 700 illustrating production logic in accordance with an example embodiment. At operation 714, the timings of the unloading on and unloading off events can be utilized by the analysis performing module 306 to calculate the period of time elapsed between these events and determine whether the time is sufficient for an unloading to occur. The production logic can include a configurable "on time" filter. If the unloading sensor is not active for a long enough time, the unloading event can be considered invalid. Thus, if the analysis performing module 306 determines at operation 714 that the time period between the unloading event on and unloading event off is insufficient for an unloading to occur, the operation will proceed to operation 717, in which the unloading event will be declared invalid.

If, on the other hand, the analysis performing module 306 determines that sufficient time has elapsed between the unloading on and unloading of events, the method can proceed to operation 715. At operation 715, the analysis performing module 306 can determine whether enough time has elapsed since last loading. The production logic can include a configurable "time since loading" filters. If not enough time has elapsed since the last valid loading event, the unloading event will be considered invalid. Thus, if the analysis performing module 306 determines that not enough time has elapsed since the last loading event, the method can proceed to operation 717 where the unloading event can be declared invalid. Otherwise, the method can proceed to 716.

At operation 716, the analysis performing module 306, based on the positional data received from the monitoring system 200 may determine whether the asset has moved between the loading and unloading events. The production logic can include a configurable "asset movement" filter. If according to the asset movement filter, the asset has not moved since the last valid loading event, the unloading event will be considered invalid. Thus, if the analysis performing module 306 decides that the asset has not sufficiently moved between the loading and unloading events, the method may proceed to operation 717 where the unloading event is declared invalid.

Unloading events that have been rejected due to on time, time since loading, or movement filters are considered invalid and are not considered part of the current load. If, however, all three above mentioned conditions are satisfied and it is determined that unloading event took sufficient time, the time period between the last loading and the unloading events is sufficient, and that the asset has moved sufficient distance between the loading and unloading events, the loading event can be declared valid at operation 718. In other words, if an unloading event is not rejected by the on time, time since loading, or movement filters it is considered a valid unloading event. In some example embodiments, when multiple consecutive unloading events occur, the last valid unloading event is considered to be part of the current load.

At operation 719, the monitoring system processor 300 may receive data associated with another unloading event and the process may repeat starting with operation 712. If the next event after either a valid or invalid unloading event is another unloading event, the new unloading event validity will be determined by the on time, time since loading, and movement filters. If, on the other hand, no data associated with another unloading event is received at operation 719, the method may proceed to operation 720. Thus, if the filter determines that a valid unloading event exists, then the current load is valid. If there is no valid unloading event, then the current load is invalid. At operation 720, the analysis performing module 306 may determine whether the unloading event was declared invalid at operation 717. If the unloading event was declared invalid at operation 717, the method can proceed to operation 721 and the load associated with the unloading event will be declared invalid. In other words, if there is not a valid loading event and a valid unloading event, then the current load is declared invalid. If, on the other hand the unloading event was valid, the method may proceed to operation 722.

At operation 722 the load associated with the loading and unloading event is added to a count (the count parameter value is incremented by one). Thus, if there is a valid loading event and a valid unloading event, the current load is valid and is counted toward the asset production for the site where the loading event occurred. The method can then proceed to operation 723, in which it can be determined whether the unloading event is followed by another loading event. If there is another loading event, then the production logic can determine whether another valid load occurs. If no other loading event occurs, then no additional load is counted.

If it is determined that another loading event follows, the method may proceed to operation 702 and the operations described above repeated. If, on the other hand, no loading event follows, the receiving module 302 can, in operation 724, receive data indicating that the engine ignition is off. The "ignition off" event can determine the end of the workday. If at operation 725, it is determined that the ignition on event follows the ignition off event, the method may proceed to operation 702 and the operations described above repeated. In the event of another ignition on event, the production logic can determine whether another valid load occurs. If, on the other hand, it is determined at operation 725 that no ignition on event follows engine ignition off event, the method proceeds to operation 726, in which production is completed. The last ignition off event can designate completion of the work day.

A system, machine, or method, as described herein, may filter at least one of the machine or asset operational data, location data, or derived data. The filter can be a machine module that implements instructions in an electronic computing device. Such instructions can be stored in a machine readable media. The filter can use a processor to apply logic rules to the data to improve accuracy. In some examples, the filter can eliminate over 90% of falsely sensed or derived events. In an example, the filter can act to determine that the event is invalid based on one or more of the following: a period of time between the beginning of the event and the ending of the event, the period of time since the last event, the distance moved since the last event. The filter can further act to determine if at least one of a cycle time, a number of loads, an amount of material moved, a time of operation, and costs associated with the asset are valid using historical data of the machine or a work site. The filter can further act to eliminate data outside a location at a work site. The filter can act to determine if the machine can perform the machine operational data using the worksite data. The worksite data can include, for example, a given location, a given time, or reference to other worksite data.

Figure 9:
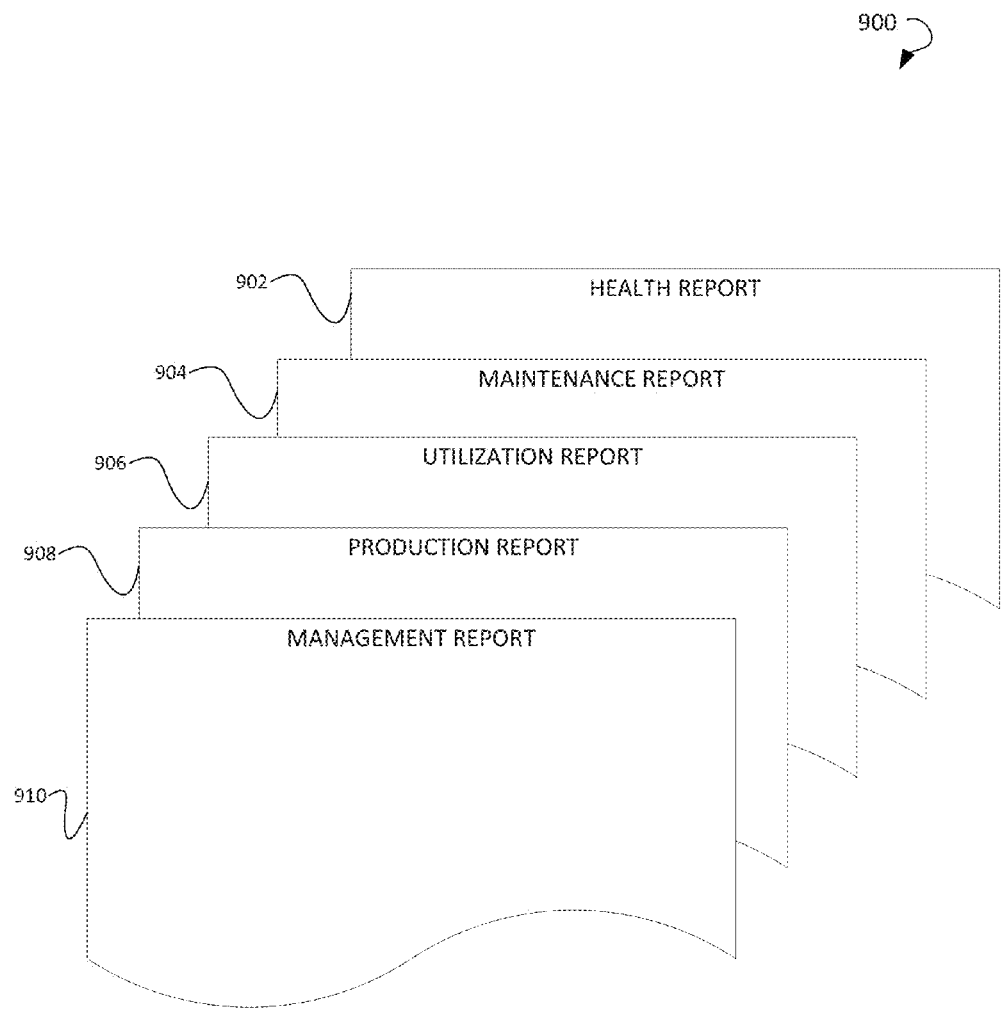
FIG. 9 is a block diagram showing a plurality of reports, in accordance with an example embodiment.

FIG. 9 is a block diagram showing a plurality of reports 900, in accordance with an example embodiment. The reports 900 can include a management report 910, a production report 908, a utilization report 906, a maintenance report 904, and a health report 902. The management report 910 can represent a high-level overview of information for each site associated with one or more of the respective asset 120. The management report 910 can summarizes the information available in one or more of other report types, such as the production report 908, the utilization report 906, the maintenance report 904, and/or the heath report 902. In some example embodiments the management report 902 can combine essential data from the above-mentioned reports and provides it in an overview format.

The production report 908 can include, but not limited to cycle times; number of loads per day, amount of the material moved each day, machine hours, and machine costs. The maintenance report 904 can include machine hours, timing of scheduled services, types of scheduled services, location of the asset, details of the scheduled services (e.g., maintenance operations, parts required, etc.). The health report 902 can include machine performance indicators, information on any alarms that have been triggered, or any other issues with the asset 120.

Figure 10:
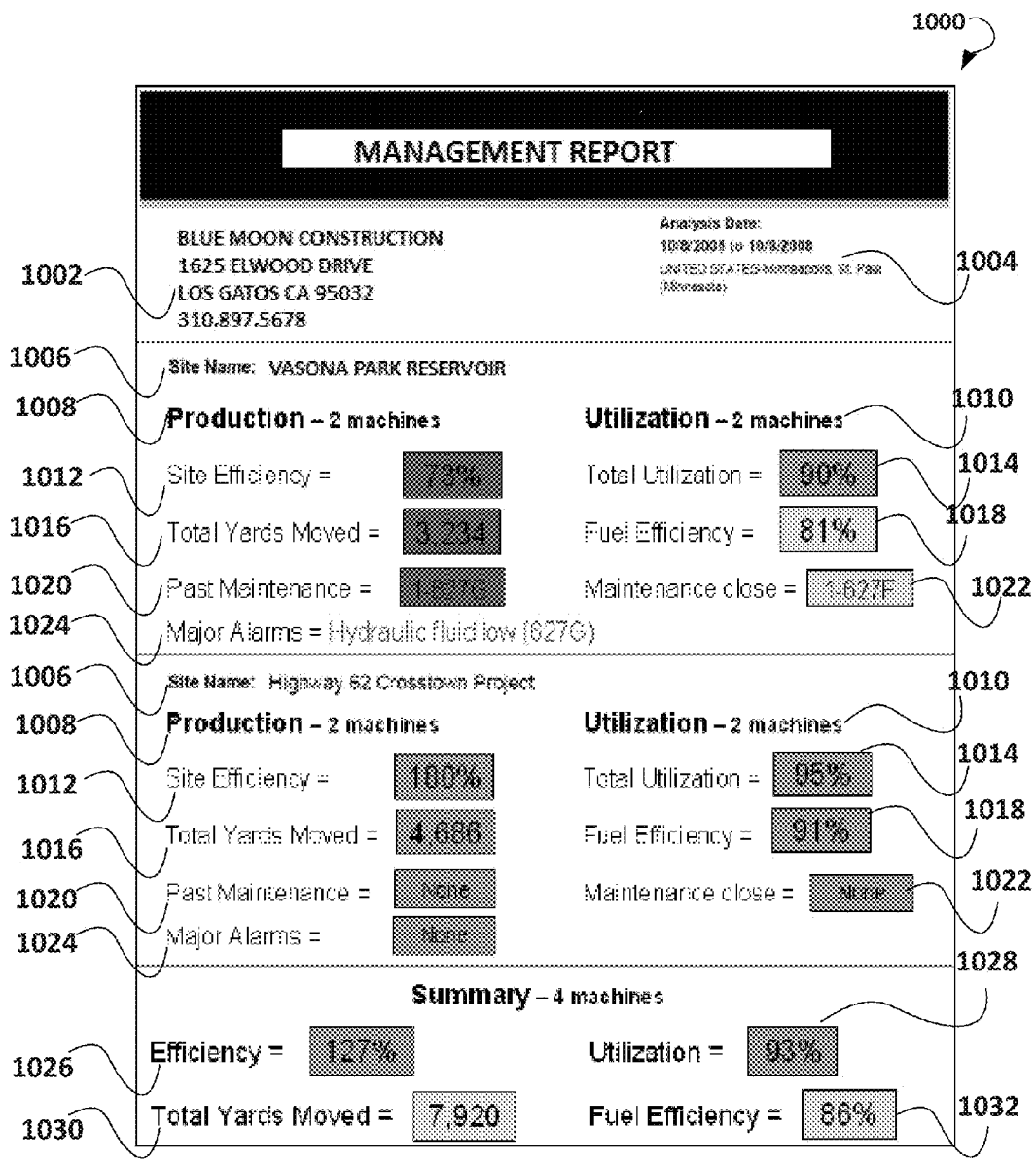
FIG. 10 is a block diagram showing a management report, in accordance with an example embodiment.

FIG. 10 is a block diagram showing a management report 1000, in accordance with an example embodiment. In some example embodiments, the management report 1000 can include customer identification information 1002, date of the analysis 1004, a site name 1006, a number of assets that are analyzed in the production report 1008, a number of the assets that are analyzed in the utilization report 1010, a site efficiency field 1012, a total utilization field 1014, a total yards moved field 1016, a fuel efficiency field 1018, a path maintenance field 1020, a maintenance close field 1022, a major alarms field 1024. The color associated with certain fields corresponds to predetermined criteria set by the clients.

Generally, red color corresponds to the data in need of most urgent attendance, yellow to the data in need of less urgent attendance, and green to the data that appears to be normal. The management report 1000 can also include a summary section, which can include fields summarizing the data for all assets and sites analyzed. Thus, the summary field can include an efficiency field 1026, a total-yards-moved field 1030, and a utilization field 1028, and a fuel efficiency field 1032.

In some example embodiments, the management report 1000 can be provided to the owners of the respective assets. The data from each site can be summarized and combined into the management report 1000. This allows the owner to easily see the problem areas on their jobsites.

FIG. 11 is a block diagram a production report 1100, in accordance with an example embodiment. The example production report 1100 can include fields with values assigned to these files. In the example production report 1100 target areas are indicated in bold. A list of the customer-provided information can pre-load into the report. These are the values the program can use to color code each section. The customer can provide this information before the report is produced. This information can be specific to how the customer bid on their job and is used as a comparison to the actual work done. Target information can include, but not limited to: an average start time, an average stop time, an average round trip distance, loads, an average travel to unload an average travel to load, an average cycle time, an efficiency load capacity, a machine cost, and a revenue per yard values. The above mentioned target information can be input by the customer and used in the profitability section of the report illustrated in FIG. 12.

FIG. 12 is a block diagram showing a utilization report 1200, in accordance with an example embodiment. In some example embodiments, the utilization report 1200 can include, but not limited to a number of hours the machine is shutdown, hours idling, hours working, fuel consumption, fuel efficiency, and other parameters. The utilization report 1200 can be generated for a project manager, a foreman, dispatcher, or an owner. As shown in the FIG. 12, the utilization report can include a list of the customer-provided information that is pre-loaded into the report. These are the values that the program can use to color code the actual values. In some example embodiments, the target information can include, but not limited to a start time, a stop time, an available time, a shutdown time, a total idle time, a total number of idle events, an average idle time, and a working time.

FIG. 13 is a block diagram showing a maintenance report 13, in accordance with an example embodiment. The maintenance report 13 can be generated for equipment managers and shop personnel. The maintenance report 13 can enable tracking the asset hours and calculating when the next service interval is.

Figure 14:
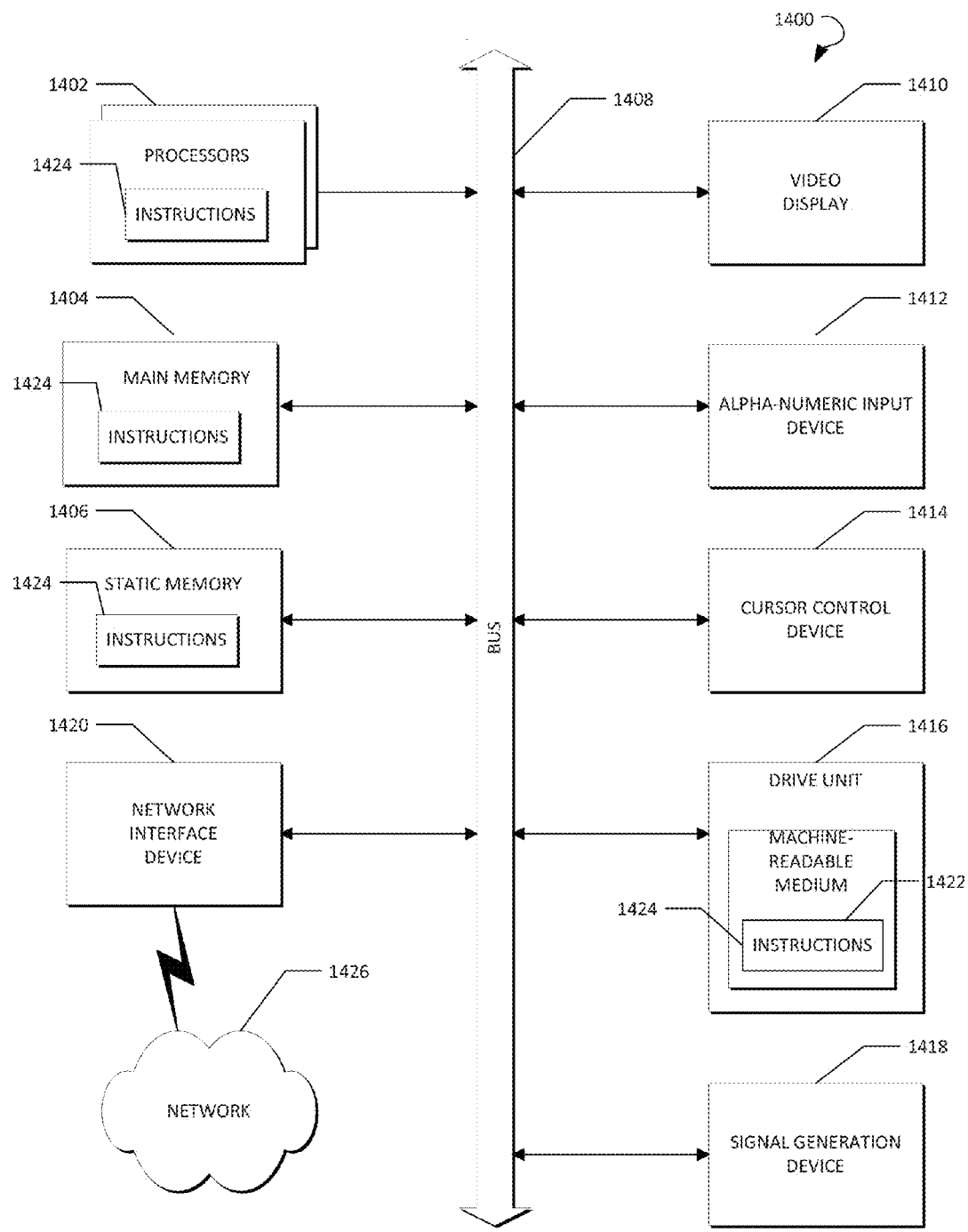
FIG. 14 is a diagrammatic representation of an example machine in the form of a computer system within which a set of instructions for causing the machine to perform any one or more of the methodologies discussed herein is executed.

FIG. 14 shows a diagrammatic representation of a computing device for a machine in the example electronic form of a computer system 1400, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor or multiple processors 1402 (e.g., a central processing unit (CPU), a graphics processing unit (GPU), or both), and a main memory 1404 and a static memory 1406, which communicate with each other via a bus 1408. The computer system 1400 can further include a video display unit 1410

(e.g., a liquid crystal displays (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a computer-readable medium 1422 on which is stored one or more sets of instructions and data structures (e.g., instructions 1424) embodying or utilized by any one or more of the methodologies or functions described herein. The instructions 1424 can also reside, completely or at least partially, within the main memory 1404 and/or within the processors 1402 during execution thereof by the computer system 1400. The main memory 1404 and the processors 1402 also constitute machine-readable media.

The instructions 1424 can further be transmitted or received over a network 1426 via the network interface device 1420 utilizing any one of a number of well-known transfer protocols (e.g., Hyper Text Transfer Protocol (HTTP), CAN, Serial, or Modbus).

While the computer-readable medium 1422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), Objective C, .Net, Java Script, ColdFusion™ or other compilers, assemblers, interpreters or other computer languages or platforms.

The above disclosure refers to position navigation systems and Global Positioning System (GPS). It is within the scope of the present invention to use other types of navigational positioning systems, including the GPS IIF system. Other systems can include Beidou, COMPASS, Galileo, GLONASS, Indian Regional Navigational Satellite System (IRNSS), or QZSS. Moreover, these systems can use Real Time Kinematic (RTK) satellite navigation to provide the real-time corrections of the positioning signal down to a meter or centimeter level of accuracy. The systems can also use differential correction signals in North American from the FAA's WAAS satellites. Accordingly, references herein solely to GPS should be read to as general position navigation systems.

The above examples refer to mobile assets. However, the present invention can be adapted to receive data from stationary assets as well. Examples of stationary assets can include power generation, industrial pumping (fluids, water, oil, gas, etc.), industrial motors, filters, groundwater testing, waste treatment, monitoring (e.g., runoff, tailing ponds, pollution controls, etc.) and other equipment used in the construction, mining, and transportation industries. The data from these stationary assets can be incorporated into the reports and provide further indications of productivity, failure, maintenance, operating characteristics, etc., which can be the same data and reports as described herein except there is no movement data.

It is further recognized by the present inventor that there is a need for methods and systems for calculation utilization on mobile equipment. The mobile equipment, asset or equipment as described herein can be construction, industrial or agricultural related equipment. When reporting utilization on mobile equipment there are issues with determining true equipment utilization. A method for utilization calculation can usually be running time of an engine or motor over a period of time. The problem with such an approach is that just because the 'prime mover' (engine or motor) is not running, does not necessarily mean that equipment is not in use and therefore being utilized. This is specifically true with certain types of construction equipment, such as aerial work platforms and material handling equipment (equipment with an independent component). Independent components are defined as pieces or components of an asset or equipment that perform or provide work functionality independent from engine status or use of the prime mover. Independent components often include aerial components and material handling components. Operators and personnel may be in the platforms or buckets (i.e., aerial components) performing work tasks and therefore this time should be part of the true utilizations of equipment, e.g., a machine, as well as the time the 'prime mover' is in operation.

In the case of material handling, materials or equipment may be lifted in the air with the prime mover off and therefore still being utilized. This time as well as the running time of the machine needs to be accounted for to calculate true utilization.

The methods and systems described herein can include methodologies and structures to detect and report times where the equipment with aerial components, e.g., the platform, bucket, or materials (e.g. material handling components) are in a working position or condition, regardless of the status of the prime mover. In an example, the prime mover can also be part of a methodology to determine utilization.

In an example people or materials are lifted into the air for periods of time. Types of such lifting equipment or aerial components, include, but are not limited to:

aerial work platforms (electric motor driven and combustion engine engine driven); booms lifts; articulated boom lifts; telescopic boom lifts; electric boom lifts; trailer boom lifts; personnel boom lifts; boom trucks; cherry pickers; bucket trucks; scissor lifts; engine driven scissor lifts; and electrical scissor lifts.

In an example material(s) is lifted into the air for periods of time or moved. Types of such material handling equipment or material handling components of equipment, include, but are not limited to:

telehandlers; forklifts; and rough terrain fork lifts.

There are different potential methods to determine if the equipment is being 'utilized' on the above equipment types or similar equipment types.

In the case of aerial work platforms, e.g., scissor lifts and bucket trucks there are various methodologies to determine how and time that the equipment is being utilized.

1) Engine or motor running. If a motor or engine is running it is expected the unit is running. Such a method can also use idling effects as a factor to utilization. On, off, idling and even rotations per minute can be characterized as engine status. Detecting and then monitoring engine status is a first threshold test of whether the asset may be in use.

2) Detect and monitor if a person is in or in proximity to the bucket (or any aerial component). This could be accomplished by methods including:

Utilizing one or more motion sensors to detect if regular motion occurs in bucket or platform. One or more heat sensors can be positioned to detect the presence and activity of a worker or user. One or more load sensors can detect the weight of a user on a bucket or other aerial component. One or more sensors can be attached to or integrated with a safety harness to detect a person's presence or activity.

In addition, a light beam or light curtain sensor can detect a person in a bucket to cut beam. A safety switch (i.e., foot pedal safety switch) or utilization switch can be used, prompting a user to interact with the switch. Detecting whether user controls are engaged can also indicate use, such as foot pedals or bucket controls.

3) Detect and monitor if boom, platform, bucket, scissor (or other aerial component) is out of rest position and is in the air. This could be accomplished by methods and structures including:

monitoring of platform 'out of rest position' or 'stored' position; limit switch (existing or added); proximity switch (out of stowed position); light beam, light curtain; load cell—boom, platform, boom arm, and bucket at rest.

Further methods and structures can include monitoring height of platform to detect 'in usage' using: angle sensor or tilt switch on boom; angle sensor or tilt switch on scissor arm; hydraulic ram length monitoring; laser encoder to determine height from base to platform.

In the case of material handlers there are methods and structures to determine if equipment is being utilized. This could be accomplished by methods and structures including:

1) Engine or motor running (engine status). If a motor or engine is running is expected the unit is running and being utilized. In an embodiment, idling effects on utilization can be a factor to utilization.

2) Detect and monitor if materials are in being used by machine (i.e., asset or equipment). Examples of such monitoring and detecting include one or more of a load sensor detection on forks (or other material handling components); forks (or material) are elevated and not in rest position; limit switch—forks out of rest position; hydraulic pressure sensor; limit switch on hydraulic ram; angle/tilt sensor on telehandler boom; limit switch—boom out of rest position; proximity switch—boom out of rest position and/or manual utilization switch—switched by equipment operator.

For both aerial and material handling components, positional data (as discussed previously) can also be utilized. The positional of the independent component in relation to another object or work site can indicate use or become a threshold detection question. Positional data for the component and second object or site can be calculated and compared for analysis.

With reference to FIGS. 1 and 2, utilization events can be tracked and determined. The utilization events are then used to determine and/or calculate the utilization of an asset, e.g., a machine, equipment, construction device. To calculate these working or utilized times (or events), the above sensors can be positioned in or on an asset 120. In an example, the asset user device 125 can be used as the sensor. The asset user device 220 can use its accelerometer, positioned determination system, e.g., GPS, or other sensor to determine movement or change in status of the asset. The sensed information by the asset 120 and/or the asset user device can be used along with inputs that would go into the monitoring system 200. As described herein, the monitoring system can be in electrical communication with the wiring harness 202 and/or be part of sensors 214.

Figure 15:
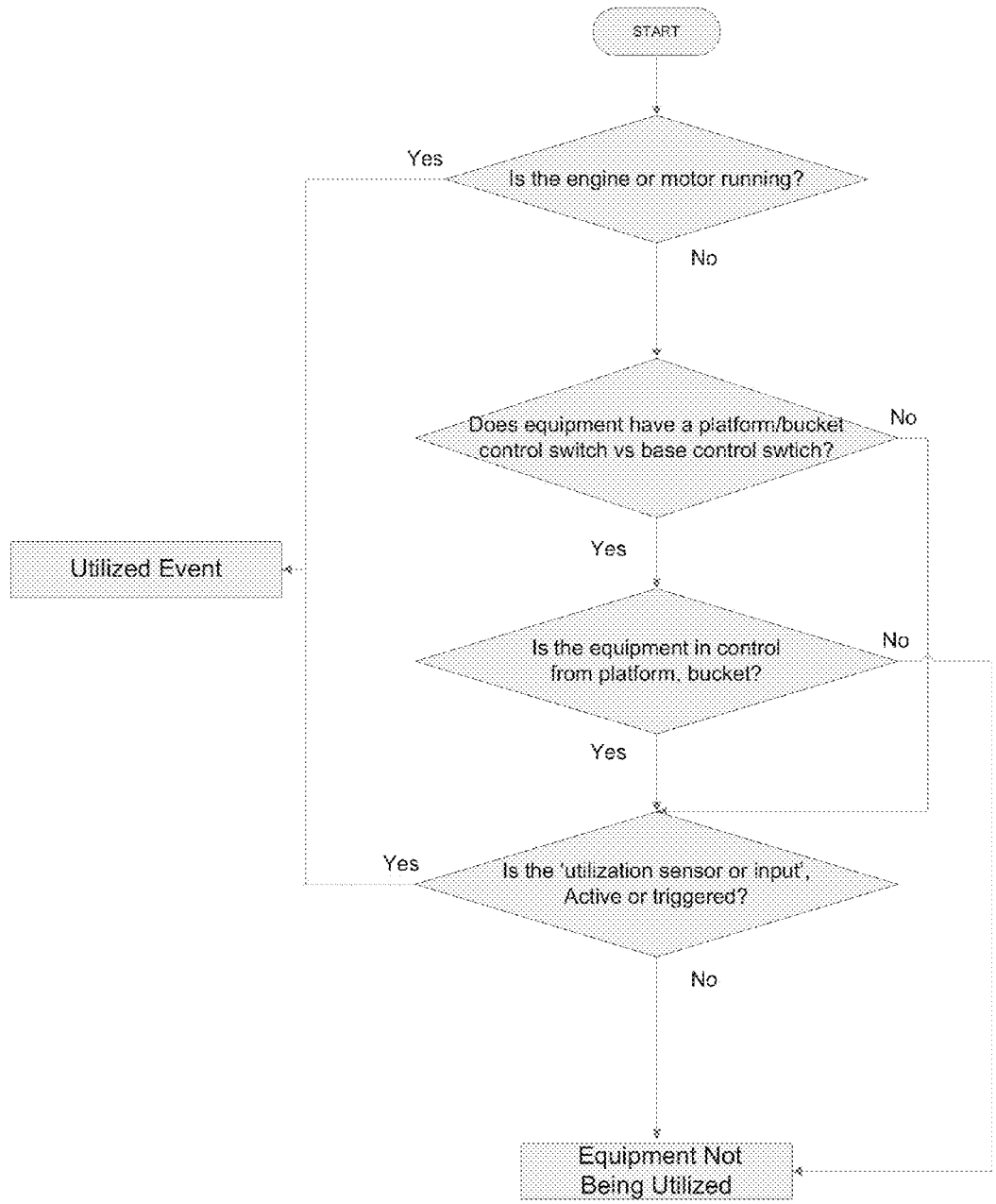
FIG. 15 is a flow chart of a method for determining utilization according to an example.
Figure 16:
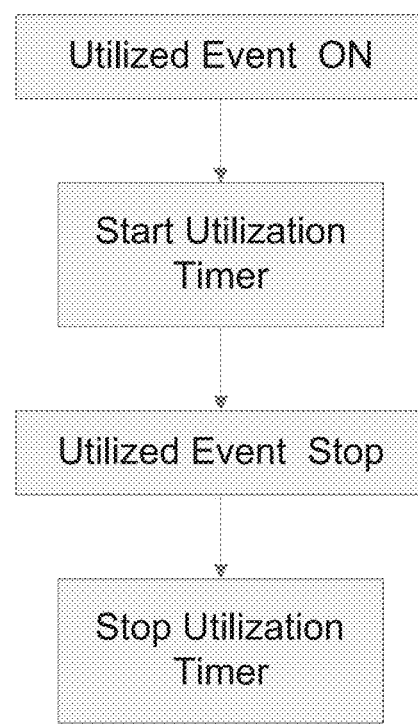
FIG. 16 is a flow chart of a method for determining utilization according to an example.

These inputs would be used in the monitoring system 200 to determine utilized event, and/or set a utilization timer. These 'utilization sensors and inputs' would be used to trigger a utilization event or timer. See example process flow for calculating a utilized event as shown in FIGS. 15 and 16.

After a start of the process flow, it is determined if the prime mover is running (check engine status). If YES, then the process determines that a utilization event is occurring. The process can then keep the time that the prime mover is running. Monitoring, such as substantially continually or intermittently can be performed at any detection step. If NO, then the process determines the type of sensor that is on the machine. This step can also be preprogrammed in the circuitry of the asset. An example, decision is whether the equipment has a platform/bucket (e.g., a moveable part of the asset or other independent component) or a user activated device, such as a switch or lever. If YES, the process then determines if the asset is being controlled from the platform or bucket. A user presence can also be detected and monitored. If NO, then it is determined that the asset is not being utilized and no utilization event has occurred. If YES, then the process determines if the utilization sensor, input or determination device is active or triggered. If YES, then it is determined that a utilization event has occurred and utilization of the asset is underway.

Returning to the process step of determining the type of sensor that is on the machine, if the answer is NO, then the process moves to determining if the utilization sensor, input or determination device is active or triggered. If YES, then it is determined that a utilization event has occurred and utilization of the asset is underway. If NO, then it is determined that the asset is not being utilized and no utilization event has occurred.

The monitoring system 200 can transmit this raw or summarized information regarding utilization to the monitoring system processor 300 to be used to generate utilization reports 182 and or billing reports. The above process can be performed in hardware, which can execute software instructions, on the asset. In a further example, the process is performed, at least in part, in a hardware, which can execute software instructions, remote from the asset.

FIG. 16 shows a process 1600 for determining utilization of the asset or equipment. At 1602, it is determined that a utilization event has occurred e.g., in the process of FIG. 15.

At 1604, a utilization timer is started. At 1606, a utilization stop event is determined, e.g., in the process of FIG. 15. At 1608, the utilization timer is stopped. Accordingly, the utilization time for a particular asset is determined. This process can be at the asset in an example. This process can be at a remote processor, e.g., monitoring system processor 300.

Figure 17:
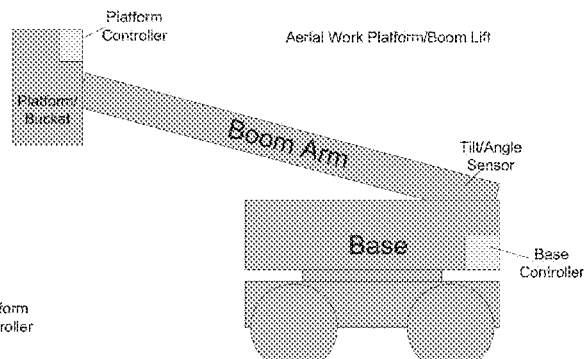
FIG. 17 is a view of an asset (equipment) that can be use with the methods, systems and structures as described herein.

FIG. 17 shows aerial work platform asset 1700, which includes a mobile base and a boom lift arm cantilevered from and connected to the base, and a platform or bucket connected to the free end of the arm. The mobile base is provided that includes a prime mover and electrical circuitry. Mobile base further includes a base controller to control operation of base, arm and/or platform. A platform controller is fixed to the platform/bucket and can control operation of the platform/bucket, arm, and/or base. A sensor is provided that can determine utilization as described herein. The sensor can be a tilt/angle sensor mounted to one of the arm or base to determine whether the arm is in an active (or engaged) position or in a rest or non-active (non-engaged) position.

Figure 18:
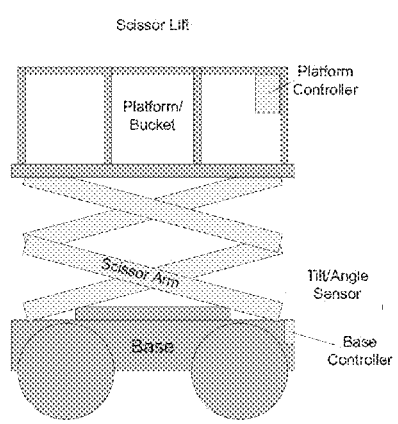
FIG. 18 is a view of an asset (equipment) that can be use with the methods, systems and structures as described herein.

FIG. 18 shows scissor lift asset 1800, which includes a mobile base and a scissor arm structure connected to the base, and a platform or bucket connected to upper end of the arm structure. The mobile base is provided that includes a prime mover and electrical circuitry. Mobile base further includes a base controller to control operation of base, arm and/or platform. A platform controller is fixed to the platform/bucket and can control operation of the platform/bucket, arm structure, and/or base. A sensor is provided that can determine utilization as described herein. The sensor can be a tilt/angle sensor mounted to one of the arm structure or base to determine whether the arm structure and, hence, the platform/bucket is in an active position or in a rest or non-active position.

An example of a scissor lift is found in U.S. Pat. No. 6,330,933, which is hereby incorporated by reference for any purpose. However, if any part of document incorporated by reference conflicts with the express disclosure herein, the present disclosure controls.

Figure 19:
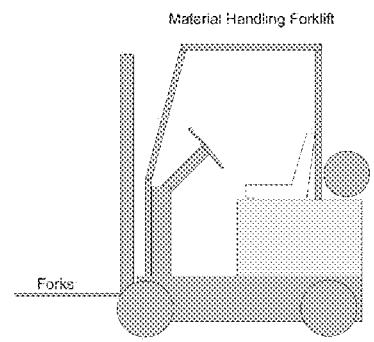
FIG. 19 is a view of an asset (equipment) that can be use with the methods, systems and structures as described herein.

FIG. 19 shows a forklift asset 1900, which includes a mobile base and a lift extending forwardly from and moveably connected to the base. The mobile base includes a prime mover and electrical circuitry and operator controls. A sensor is provided that can determine utilization as described herein. The sensor can be a tilt/angle sensor mounted to one of the lift or base to determine whether the lift is in an active position or in a rest or non-active position.

Figure 20:
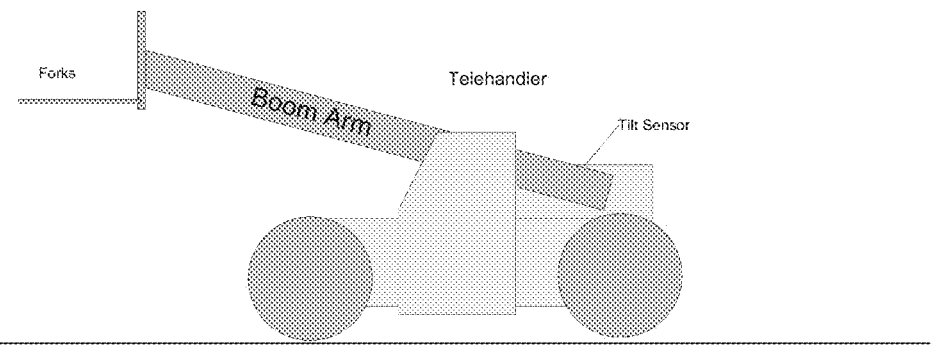
FIG. 20 is a view of an asset (equipment) that can be use with the methods, systems and structures as described herein.

FIG. 20 shows a telehandler asset 2000, which includes a mobile base and a boom lift arm pivotally connected to the base, and lift forks at one end of the arm. The mobile base can include a prime mover and electrical circuitry. Mobile base can further include a user operator controls, which can be similar to a fork lift to control operation of base, arm and/or fork. A sensor is provided that can determine utilization as described herein. The sensor can be a tilt/angle sensor mounted to one of the arm or base or forks to determine whether the arm or forks are in an active position or in a rest or non-active position.

Embodiments of the present invention further include a method of monitoring an asset including an independent component, the method including: receiving at an electronic device data related to operation of an asset, the data including utilization data of an independent component of the asset; interpreting, using a processor, the utilization to determine an utilization or operational characteristic of the asset; performing, using a processor, analysis of the utilization or operational characteristic in view of a stored target to produce a performance output; filtering, using a processor, to improve accuracy; and providing a report that includes the operational characteristic and/or utilization output; wherein utilization data of the independent component is generated by detecting the engine status of a prime mover of the asset; detecting a position of the independent component; wherein the independent component provides work functionality independent of the engine status.

The at least one machine operational data can be collected by a monitoring system installed on the asset, the monitoring system including a monitoring device and sensors. The machine operational data can include one or more of the following: positional data, engine status, a velocity, a direction, a key on event, a key off event, a door open event, a door closed event, a location, a fuel efficiency, an idle time, a production statistics, a preventive maintenance schedule, a maintenance history, a cycle time, a utilization time period, a fault data, and an alarm data.

The receiving at an electronic device data related to operation of an asset includes receiving at a mobile device, positional data, operational data or both from an asset.

The mobile device can be a mobile telephone and the telephone sends or receives positional data, operational data and control functions to or from the asset. Examples of control functions include operational control, alarms, display prompts, or audio prompts for example.

Further embodiments include a method of monitoring utilization of equipment including an independent component, comprising:
  detecting the engine status of a prime move of the equipment;
  determining if the engine status is active, then detecting a position of the independent component
  determining if the position is engaged; then determining utilization data of the equipment including the independent component; wherein the independent component provides work functionality independent of the engine status.

The method can also include detecting the presence of a user in proximity to the independent component of the equipment or the user controls of the independent component of the equipment. User controls can include a foot pedal or bucket controls, for example.

After detecting the engine status, monitoring the engine status continually or intermittently can be performed. After detecting the presence of a user or the position of the independent component, monitoring the presence of a user continually or intermittently can also be performed.

An embodiment includes a computer-readable medium including instructions, which when executed by one or more processors, perform the following operations: receive data related to operation of an asset, the data including utilization data of an independent component; interpret the utilization data to determine an operational characteristic of the machine; filter at least one of the utilization data, and operational characteristic to improve accuracy; perform analysis of the operational characteristic in view of a stored target to produce a performance output; and provide a report that includes the operational characteristic and the utilization output.

The utilization data of the independent component is generated by detecting the engine status of a prime mover of the asset; detecting a position of the independent component; wherein the independent component provides work functionality independent of the engine status.

Creating operational data on a device separate from the positional data; and sending additional data from a mobile device associated and removable from the machine can also be performed.

An example of a lift device is described in U.S. Patent Publication No. 2009/0183927, which is hereby incorporated by reference for any purpose. However, if any part of document incorporated by reference conflicts with the express disclosure herein, the present disclosure controls.

An example of a lift device is described in U.S. Patent Publication No. 2009/0146828, which is hereby incorporated by reference for any purpose. However, if any part of document incorporated by reference conflicts with the express disclosure herein, the present disclosure controls.

The determination of the utilization of the prime mover is described herein. On example of how to determine run-time of a motor can be found in U.S. Pat. Nos. 6,822,930; 3,965,669 and U.S. Patent Publication No. 2011/0227744, which are hereby incorporated by reference for any purpose. However, if any part of documents incorporated by reference conflicts with the express disclosure herein, the present disclosure controls.

Other patent documents that generally relate to the present disclosure are U.S. Patent Publication Nos. 2009/0015422 and 2009/0140872, which are hereby incorporated by reference for any purpose. However, if any part of documents incorporated by reference conflicts with the express disclosure herein, the present disclosure controls.

Thus, a method for asset information reporting and method for calculation of utilization of mobile equipment have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A method of monitoring utilization of equipment, the method comprising:
   determining, by a processor, using operational data received from a monitoring system coupled to the equipment and that can operate independently of a prime mover of the equipment, a first period of time during which the prime mover of the equipment is running according to a utilization or operational characteristic of the equipment interpreted from the operational data;
   determining, by the processor, using sensor data received from the monitoring system that is coupled to at least one sensor on the equipment, an amount of usage of an independent component of the equipment, based on at least one of: a position of the independent component, and a presence of personnel in or on the independent component, either or both being indicative of use of the independent component and being detectable using the at least one sensor, the independent component corresponding to a component of the equipment that performs or provides work functionality independent of use of the prime mover;
   determining, by the processor from the operational data and the sensor data, a second period of time during which the independent component of the equipment is being used while the prime mover is not running, wherein the second period of time does not overlap with the first period of time;
   determining, by the processor, an overall equipment utilization based on both the first and second time periods; and
   outputting, by the processor, an indication of the overall equipment utilization.

2. The method of claim 1, further comprising:
   performing, using the processor, analysis of the utilization or operational characteristic in view of a stored target to produce a performance output;
   filtering, using the processor, to improve accuracy; and
   providing a report that includes the operational characteristic and/or utilization output.

3. The method of claim 2, wherein the operational data includes one or more of the following: positional data, engine status, a velocity, a direction, a key on event, a key off event, a door open event, a door closed event, a location, a fuel efficiency, an idle time, a production statistics, a preventive maintenance schedule, a maintenance history, a cycle time, a utilization time period, a fault data, and an alarm data.

4. The method of claim 2, further comprising receiving at a mobile device, positional data, operational data or both from the monitoring system coupled to the equipment.

5. The method of claim 4, wherein the mobile device is a mobile telephone and the telephone sends or receives positional data, operational data and control functions to or from the asset.

6. The method of claim 1, further comprising detecting the presence of a user in proximity to the independent component or user controls of the independent component.

7. The method of claim 6, wherein detecting the presence of a user in proximity to the independent component comprises utilizing at least one of:
   one or more motion sensors to detect if regular motion occurs;
   one or more heat sensors to detect the presence and activity of the user;
   one or more load sensors to detect the weight of the user;
   one or more sensors attached to or integrated with a safety harness to detect the user's presence or activity;
   a light beam or light curtain sensor to detect a person in a bucket to cut beam; and
   a safety switch and utilization switch.

8. The method of claim 1, further comprising after detecting an engine status, monitoring the engine status continually or intermittently.

9. The method of claim 1, further comprising after detecting the presence of a user, monitoring the presence of a user continually or intermittently.

10. The method of claim 1, further comprising after detecting the position of the independent component, monitoring the position of the independent component continually or intermittently.

11. The method of claim 1, wherein detecting engine status comprises one or more of detecting on/off status, idle status and rotations per minute status.

12. The method of claim 1, wherein detecting the position of the independent component comprises utilizing one or more of:
   monitoring a platform 'out of rest position' or 'stored' position;
   a limit switch;
   a proximity switch;
   light beam or light curtain;
   load cell comprising at least one of a boom, platform, boom arm, and bucket at rest;

monitoring height of the platform to detect 'in usage' using at least one of: an angle sensor or tilt switch on boom; an angle sensor or tilt switch on scissor arm; an hydraulic ram length monitoring; and laser encoder to determine height from base to platform.

13. The method of claim 1, wherein the independent component comprises one or more of an aerial work platform; booms lift; articulated boom lift; telescopic boom lift; electric boom lift; trailer boom lift; personnel boom lift; boom truck; cherry picker; bucket truck; scissor lift; engine driven scissor lift; and electrical scissor lift.

14. The method of claim 1, wherein the independent component comprises one or more of an aerial component and a material handling component.

15. The method of claim 14, wherein detecting a position of the material handling component comprises utilizing one or more of:
   a load sensor detection on the material handling components;
   a limit switch;
   an hydraulic pressure sensor;
   a limit switch on a hydraulic ram;
   an angle/tilt sensor on a telehandler boom;
   a proximity switch.

16. The method of claim 14, wherein the material handling component comprises one or more of a telehandler, a forklift fork, and a rough terrain forklift fork.

17. A non-transitory computer-readable medium comprising instructions for monitoring utilization of equipment, which when executed by one or more processors, perform the following operations:
   determining, by a processor, using operational data received from a monitoring system coupled to the equipment and that can operate independently of a prime mover of the equipment, a first period of time during which the prime mover of the equipment is running according to a utilization or operational characteristic of the equipment interpreted from the operational data;
   determining, by the processor, using sensor data received from the monitoring system that is coupled to at least one sensor on the equipment, an amount of usage of an independent component of the equipment, based on at least one of: a position of the independent component, and a presence of personnel in or on the independent component, either or both being indicative of use of the independent component and being detectable using the at least one sensor, the independent component corresponding to a component of the equipment that performs or provides work functionality independent of use of the prime mover;
   determining, by the processor from the operational data and the sensor data, a second period of time during which the independent component of the equipment is being used while the prime mover is not running, wherein the second period of time does not overlap with the first period of time;
   determining, by the processor, an overall equipment utilization based on both the first and second time periods; and
   outputting, by the processor, an indication of the overall equipment utilization.

18. The non-transitory computer-readable medium of claim 17, further comprising instructions for:
   creating, on a device, operational data separate from positional data; and
   sending additional data from a mobile device associated with, and removable from, the equipment.

19. The non-transitory computer-readable medium of claim 17, further comprising instructions for detecting the presence of a user in proximity to the independent component or user controls of the independent component.

* * * * *